(12) United States Patent
Jiang et al.

(10) Patent No.: US 12,105,606 B2
(45) Date of Patent: Oct. 1, 2024

(54) SIM CARD DETECTION FAILURE RECOVERY METHOD FOR ELECTRONIC DEVICE AND ELECTRONIC DEVICE

(71) Applicant: Huawei Technologies Co., Ltd., Shenzhen (CN)

(72) Inventors: Boer Jiang, Shanghai (CN); Shaojun Wang, Shanghai (CN); Yu Liu, Shenzhen (CN); Chunyan Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 17/641,029

(22) PCT Filed: Jul. 22, 2020

(86) PCT No.: PCT/CN2020/103557
§ 371 (c)(1),
(2) Date: Mar. 7, 2022

(87) PCT Pub. No.: WO2021/042894
PCT Pub. Date: Mar. 11, 2021

(65) Prior Publication Data
US 2022/0327036 A1 Oct. 13, 2022

(30) Foreign Application Priority Data
Sep. 6, 2019 (CN) .......................... 201910844617.4

(51) Int. Cl.
*G06F 11/22* (2006.01)
*H04B 1/3816* (2015.01)
*H04W 24/04* (2009.01)

(52) U.S. Cl.
CPC ...... *G06F 11/2289* (2013.01); *G06F 11/2284* (2013.01); *H04B 1/3816* (2013.01); *H04W 24/04* (2013.01)

(58) Field of Classification Search
CPC .. G06F 11/2289; G06F 11/2284; G06F 11/22; H04W 24/04; H04W 24/00; H04B 1/3816; H04B 1/3818
See application file for complete search history.

(56) References Cited

U.S. PATENT DOCUMENTS

2008/0070629 A1   3/2008  Yuan
2013/0290617 A1  10/2013  Veneroso et al.

FOREIGN PATENT DOCUMENTS

CN   101150792 A   3/2008
CN   102098390 A   6/2011
(Continued)

OTHER PUBLICATIONS

ISO/IEC 7816-3, "Information technology—Identification cards—Integrated circuit(s) cards with contacts—Part 3: Electronic signals and transmission protocols," Dec. 15, 1997, 32 pages.

*Primary Examiner* — Keith Ferguson
(74) *Attorney, Agent, or Firm* — Conley Rose, P.C.

(57) ABSTRACT

A subscriber identification module (SIM) card detection failure recovery method for an electronic device includes that the electronic device identifies a card recovery scenario, where card recovery includes whether to power on a SIM card. A configurable timer is started based on the card recovery scenario. The electronic device periodically obtains, based on a time set by the timer, power-on information for powering on the SIM card. The electronic device determines a power-on condition of the SIM card based on the power-on information. If the power-on condition is met, the electronic device powers on the SIM card.

18 Claims, 12 Drawing Sheets

(56) References Cited

FOREIGN PATENT DOCUMENTS

| | | |
|---|---|---|
| CN | 103650058 A | 3/2014 |
| CN | 104754574 A | 7/2015 |
| CN | 105809236 A | 7/2016 |
| CN | 104079724 B | 9/2016 |
| CN | 106792635 A | 5/2017 |
| CN | 107743164 A | 2/2018 |
| CN | 104243650 B | 5/2018 |
| CN | 109067416 A | 12/2018 |
| CN | 110445932 A | 11/2019 |
| EP | 2854379 A1 | 4/2015 |
| KR | 20040100632 A | 12/2004 |
| KR | 20060078497 A | 7/2006 |
| WO | 2012089334 A2 | 7/2012 |
| WO | 2012122856 A1 | 9/2012 |
| WO | WO-2015066853 A1 * | 5/2015 ........ H04M 1/72519 |

* cited by examiner

SIM CARD DETECTION FAILURE RECOVERY METHOD FOR ELECTRONIC DEVICE AND ELECTRONIC DEVICE

CROSS-REFERENCE TO RELATED APPLICATIONS

This application is a U.S. National Stage of International Patent Application No. PCT/CN2020/103557 filed on Jul. 22, 2020, which claims priority to Chinese Patent Application No. 201910844617.4 filed on Sep. 6, 2019. Both of the aforementioned applications are hereby incorporated by reference in their entireties.

TECHNICAL FIELD

The present application relates to the field of electronics technologies, and in particular, to a SIM card detection failure recovery method for an electronic device and an electronic device.

BACKGROUND

Currently, an electronic device generally supports a hot plug function of a SIM card. Hot plug means that a user does not need to turn off the electronic device, then unplug the card, plug the card, and finally turn on the electronic device when plugging and unplugging the SIM card. The user can unplug or plug the SIM card when the electronic device is turned on. When the user hot plugs the SIM card, an electrical level of an interruption pin in a SIM card holder at a SIM card interface in the electronic device changes. The electronic device supplies power to the SIM card based on an electrical level state of the interruption pin.

However, when the interruption pin is abnormal, the electronic device does not supply power to the SIM card when the SIM card is plugged. Consequently, the user cannot use the SIM card. The SIM card is in a card detection failure state, and the user needs to restart the electronic device to recover the SIM card. Consequently, user experience is affected.

In addition, when abnormal data exchange occurs during use of the SIM card, the electronic device powers off the SIM card, and the SIM card is in the card detection failure state. In this case, in the conventional technology, the user needs to hot plug the SIM card or restart the electronic device, so that normal communication of the SIM card can be implemented. Consequently, user experience is poor.

In addition, if the SIM card cannot normally operate at a clock frequency provided by the electronic device, services of the electronic device, for example, internet access and calling, cannot be normally performed. In this case, there is no method for recovering communication of the SIM card in the conventional technology.

When the normal communication of the SIM card can be implemented, the user can use a mobile cellular network, for example, 3G, 4G, or 5G, a calling service, and an SMS message service of the electronic device. To improve user experience, how to recover the communication of the SIM card when the user hot plugs the SIM card, when the interruption pin is abnormal, when the abnormal data exchange occurs during the use of the SIM card, and when the SIM card cannot normally operate at the clock frequency provided by the electronic device is a research direction of the industry.

SUMMARY

Embodiments of this application provide a SIM card detection failure recovery method for an electronic device. When a SIM card detection failure occurs, the SIM card detection failure can be more accurately and timely recovered according to the method. Embodiments of this application further provide a SIM card power-on method for an electronic device. When a clock frequency at which a SIM card can operate is inconsistent with a clock frequency provided by the electronic device to the SIM card, the electronic device cannot normally use a mobile cellular network, make a call, or text an SMS message. According to the method, the electronic device can effectively use the mobile cellular network again, make a call, and text an SMS message.

According to a first aspect, a SIM card detection failure recovery method for an electronic device is provided. The electronic device of the method has a SIM card tray, a SIM card interface, and a modem. The SIM card tray is configured to place a SIM card. The SIM card interface is configured to connect to the SIM card. The modem is connected to the SIM card interface. The modem is configured to detect the SIM card. The method specifically includes: The electronic device obtains power-on information, where the power-on information includes at least one of a status of the SIM card, a status of the SIM card tray, a status of the modem, and whether NV items for the SIM card are successfully stored, the NV items for the SIM card record operator information of the SIM card, the NV items for the SIM card are used to configure a network type of the modem, the status of the SIM card includes: the SIM card is detected by the modem and the SIM card is not detected by the modem, and the status of the modem includes: the modem is turned on and the modem is turned off; the electronic device determines that the power-on information meets the following conditions: the SIM card is not detected by the modem, the SIM card tray is plugged into the SIM card interface, the modem is turned on, and the NV items for the SIM card are successfully stored; and the electronic device powers on the SIM card. In this way, the electronic device determines, based on the power-on information, whether the SIM card needs to be powered on. The electronic device performs card detection failure recovery on the SIM card only when the SIM card is not detected by the modem, the card tray is in place, and the modem is turned on. In addition, in the solution of this application, when the NV items are not successfully stored, the modem is normally restarted, and when the SIM card is powered off, normal power-off of the SIM card is not interfered with. In this way, card detection failure recovery can be more accurately and effectively performed on the SIM card.

With reference to the first aspect, in a possible implementation, that the electronic device powers on the SIM card includes: The electronic device generates a power-on instruction by using an application processor; and the electronic device powers on the SIM card by using the modem in response to the power-on instruction. The application processor determines, based on the power-on information, whether a card detection failure recovery procedure needs to be performed on the SIM card. If the card detection failure recovery procedure needs to be performed on the SIM card, the application processor sends an instruction to instruct the modem to power on the SIM card. In this way, card detection failure recovery can be more specifically performed on the SIM card.

With reference to the first aspect, in a possible implementation, that the modem is turned on includes: The modem can power on the SIM card according to the power-on instruction from the application processor, and the modem can power off the SIM card according to a power-off instruction from the application processor. In this way, it can be ensured that the modem can normally operate in a process of performing card detection failure recovery on the SIM card, that is, the SIM card can be powered on or off according to an instruction from the application processor.

With reference to the first aspect, in a possible implementation, that the electronic device powers on the SIM card further includes: The electronic device detects that an airplane mode is not enabled; when the airplane mode is enabled, a radio frequency communication function of the modem is disabled; and the electronic device powers on the SIM card.

With reference to the first aspect, in a possible implementation, that the electronic device powers on the SIM card further includes: The electronic device detects that the radio frequency communication function is successfully reenabled when the modem is restarted; and the electronic device powers on the SIM card. Alternatively, if the radio frequency function is not successfully reenabled, the electronic device does not power on the SIM card. In this way, power consumption of the electronic device can be reduced.

With reference to the first aspect, in a possible implementation, that the electronic device powers on the SIM card further includes: The electronic device detects that a display is on; and the electronic device powers on the SIM card. The electronic device 100 powers on the SIM card only when the display is on. When the display is off, the electronic device 100 does not power on the SIM card. This can reduce power consumption.

With reference to the first aspect, in a possible implementation, that the electronic device 100 powers on the SIM card includes: The electronic device 100 detects that a battery level is lower than a first threshold, and the electronic device does not power on the SIM card. In this way, power consumption can be reduced when the battery level of the electronic device 100 is low.

With reference to the first aspect, in a possible implementation, that the electronic device 100 powers on the SIM card includes: When the electronic device 100 detects that the display is off, the electronic device obtains the battery level of the electronic device; and the electronic device 100 powers on the SIM card when the battery level is higher than a second threshold. In this way, it can be ensured that the electronic device powers on the SIM card and affects normal use of the electronic device.

With reference to the first aspect, in a possible implementation, that the electronic device obtains power-on information specifically includes: The electronic device sends a first instruction to the SIM card at an interval of a preset time by using the modem, where the first instruction is used to query whether the SIM card is powered on; and when the modem in the electronic device does not receive, within the preset time, a response returned by the SIM card for the first instruction, the electronic device obtains the power-on information. The power-on information is obtained only when the SIM card is not detected. The electronic device does not need to obtain the power-on information when the SIM card can be detected. In this way, the electronic device can more accurately determine a scenario in which card detection failure recovery needs to be performed on the SIM card.

With reference to the first aspect, in a possible implementation, the SIM card has a reset pin, a voltage pin, a clock pin, and an input/output interface. That the electronic device powers on the SIM card by using the modem includes: The electronic device sets the reset pin to a low electrical level by using the modem; the electronic device sets the voltage pin to a high electrical level by using the modem; the electronic device sets the input/output interface to a receiving state by using the modem; and the electronic device provides a clock signal to the clock pin by using the modem.

According to a second aspect, a SIM card power-on method for an electronic device is provided. The electronic device in the method has a SIM card. The method includes: The electronic device powers on the SIM card, and provides a clock signal of a first frequency to the SIM card; if a status word of network access authentication from the SIM card is different from a first status word, the electronic device powers off the SIM card, where the first status word indicates that the SIM card can communicate with a base station under the clock signal provided by the electronic device; and the electronic device powers on the SIM card, and provides a clock signal of a second frequency to the SIM card, where the second frequency is different from the first frequency. When a clock frequency at which the SIM card can operate is inconsistent with a clock frequency provided by the electronic device to the SIM card, the electronic device cannot normally use a mobile cellular network, make a call, or text an SMS message. According to the method, the modem adjusts the clock frequency provided to the SIM card, and then provides an adjusted clock frequency to the SIM card. In this way, the SIM card can be recovered to normally operate. In addition, the electronic device is recovered to use the mobile cellular network, make the call, and text the SMS message. In this way, a user can use a mobile cellular network, make a call, and text an SMS message without replacing the SIM card.

With reference to the second aspect, in a possible implementation, the electronic device has an application processor and a modem. That the electronic device powers on the SIM card, and provides a clock signal of a second frequency to the SIM card includes: The electronic device generates a clock adjustment instruction by using the application processor, where the clock adjustment instruction is used to adjust a frequency of a clock signal provided by the modem to the SIM card to the second frequency; and the electronic device powers on the SIM card, and provides the clock signal of the second frequency to the SIM card, where the second frequency is different from the first frequency. The modem is controlled by the application processor to adjust a clock frequency provided to the SIM card. The application processor determines whether the clock frequency of the modem needs to be adjusted. In this way, the clock frequency provided by the modem to the SIM card can be more effectively adjusted.

With reference to the second aspect, in a possible implementation, that the electronic device powers on the SIM card, and if a status word of network access authentication from the SIM card is different from a first status word, the electronic device powers off the SIM card includes: The electronic device powers off the SIM card by using the modem, and the application processor intercepts a status of the SIM card that is sent by the modem. When the SIM card is powered off, the application processor intercepts the status of the SIM card that is sent by the modem. In this way, prompt information, for example, prompt information indicating that the SIM card is not detected, does not occur on a user interface. In this way, the user does not restart a mobile phone or hot plugs the SIM card because the user sees the prompt information. This affects user experience. In this case, power-off information for the SIM card is intercepted, and the SIM card is powered on without perception of the user. In this way, user experience can be improved.

With reference to the second aspect, in a possible implementation, the method includes: The electronic device powers on the SIM card, and provides a clock signal of a first frequency to the SIM card; and the application processor determines whether first reset information sent by the SIM card is consistent with second answer-to-reset information stored in the application processor, and if the first reset information sent by the SIM card is consistent with the second answer-to-reset information stored in the application processor, the application processor sends an instruction to enable the modem to adjust a clock frequency provided to the SIM card. The second answer-to-reset information indicates that a clock frequency range in which the SIM card can operate does not match the clock frequency provided by the modem. The electronic device powers on the SIM card, and provides a clock signal of a second frequency to the SIM card, where the second frequency is different from the first frequency. When a clock frequency at which the SIM card can operate is inconsistent with a clock frequency provided by the electronic device to the SIM card, the electronic device cannot normally use a mobile cellular network, make a call, or text an SMS message. According to the method, the modem adjusts the clock frequency provided to the SIM card, and then provides an adjusted clock frequency to the SIM card. In this way, the SIM card can be recovered to normally operate. In addition, the electronic device is recovered to use the mobile cellular network, make the call, and text the SMS message. In this way, a user can use a mobile cellular network, make a call, and text an SMS message without replacing the SIM card.

According to a third aspect, an electronic device is provided. The electronic device includes: a SIM card tray, a SIM card interface, a modem, a communications interface, a memory, and a processor. The SIM card tray is configured to place a SIM card. The SIM card interface is configured to connect to the SIM card. The modem is connected to the SIM card interface. The modem is configured to detect the SIM card. The communications interface and the memory are coupled to the processor. The memory is configured to store computer program code. The computer program code includes computer instructions. When the processor reads the computer instructions from the memory, the electronic device is enabled to perform any possible implementation in the first aspect or any possible implementation in the second aspect.

According to a fourth aspect, a chip system is provided. The chip system includes an application processor and a baseband processor, and the baseband processor includes a modem. The application processor is configured to: obtain status information of the modem and determine whether NV items for a SIM card are successfully stored, generate a power-on instruction to instruct the modem to power on the SIM card, generate a power-off instruction to instruct the modem to power off the SIM card, and generate a clock frequency adjustment instruction to instruct the modem to adjust a clock frequency of a clock signal provided to the SIM card. The baseband processor is configured to: obtain a status of the SIM card and a status of a SIM card tray by using the modem, power on the SIM card according to the power-on instruction of the application processor, power off the SIM card according to the power-off instruction of the application processor, and adjust, according to the clock frequency adjustment instruction of the application processor, the clock frequency of the clock signal provided to the SIM card.

According to a fifth aspect, a computer-readable storage medium is provided. The computer-readable storage medium includes instructions. When the instructions are run on an electronic device, the electronic device is enabled to perform any possible implementation in the first aspect or any possible implementation in the second aspect.

According to a sixth aspect, a computer program product is provided. When the computer program product is run on a computer, the computer is enabled to perform any possible implementation in the first aspect or any possible implementation in the second aspect.

BRIEF DESCRIPTION OF DRAWINGS

To describe technical solutions in embodiments of this application more clearly, the following briefly describes accompanying drawings used in embodiments of this application.

DESCRIPTION OF EMBODIMENTS

Figure 1:
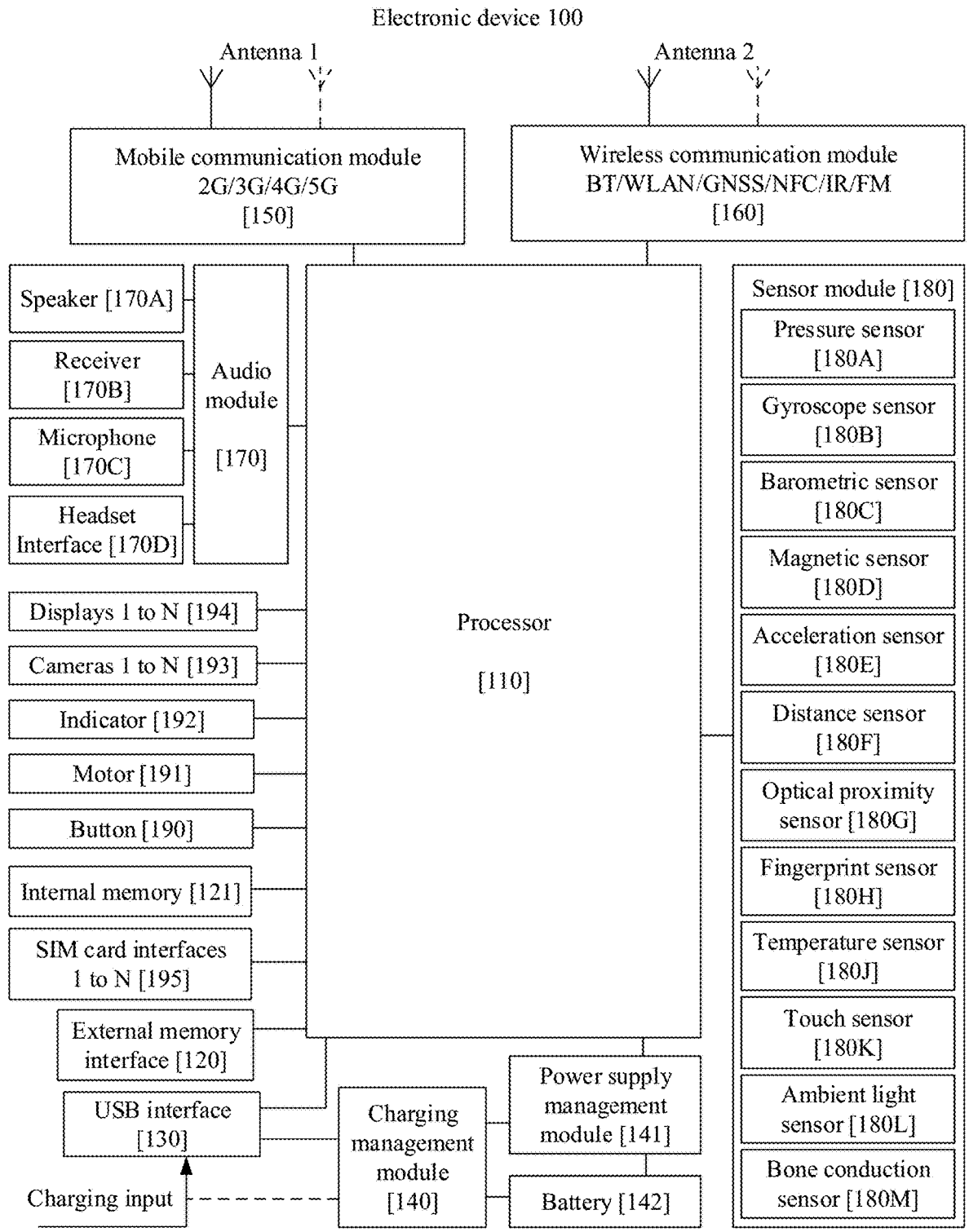
FIG. 1 is a schematic diagram of a structure of an electronic device according to an embodiment of this application.

The following clearly describes the technical solutions in embodiments of this application in detail with reference to the accompanying drawings. In descriptions of embodiments of this application, unless otherwise stated, "I" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

An electronic device, a user interface used for such an electronic device, and an embodiment used for such an electronic device are described below. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, for example, a laptop computer (Laptop) having a touch-sensitive surface or a touch panel. It should be further understood that, in some other embodiments, the electronic device may not be a portable electronic device, but is a desktop computer having a touch-sensitive surface or a touch panel.

A term "user interface (user interface, UI)" in the specification, claims, and accompanying drawings of this application is a medium interface for interaction and information exchange between a user and an application or an operating system, and implements conversion between an internal form of information and a form acceptable to the user. A user interface of the application is source code written in a specific computer language such as java or an extensible markup language (extensible markup language, XML). The source code of the interface is parsed and rendered on a terminal device, and finally is presented as user-recognizable content, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scroll bar (scrollbar), a picture, and a text. An attribute and content of the control in the interface are defined by using a tag or a node. For example, the control included in the interface is defined in the XML by using a node such as <Textview>, <ImgView>, or <VideoView>. One node corresponds to one control or attribute in the interface. After being parsed and rendered, the node is displayed as user-visible content. In addition, interfaces of many applications such as a hybrid application (hybrid application) usually further include a web page. The web page, also referred to as a page, may be understood as a special control embedded in an application interface. The web page is source code written in a particular computer language, for example, a hypertext markup language (hyper text markup language, GTML), a cascading style sheet (cascading style sheets, CSS), or a java script (JavaScript, JS). A source code of the web page may be loaded and displayed as user-recognizable content by a browser or a web page display component with a function similar to that of the browser. Specific content included in the web page is also defined by using a tag or a node in the source code of the web page. For example, an element and an attribute of the web page are defined in the GTML by using <p>,<img>,<video>,and <canvas>.

A common representation form of the user interface is a graphical user interface (graphic user interface, GUI), and is a user interface that is displayed in a graphical manner and related to a computer operation. An interface element may be an icon, a window, a control, or the like displayed on a display of the electronic device. Controls may include visual interface elements such as an icon, a button, a menu, a tab, a text box, a dialog box, a status bar, a navigation bar, or a widget.

FIG. 1 is a schematic diagram of a structure of the electronic device 100.

The electronic device 100 is used as an example below to describe embodiments in detail. It should be understood that the electronic device 100 shown in FIG. 1 is merely an example, and the electronic device 100 may have more or fewer components than those shown in FIG. 1, or two or more components may be combined, or different component configurations may be used. Various components shown in the figure may be implemented in hardware that includes one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of the software and the hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache.

The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, to improve system efficiency.

In some embodiments of this application, the application processor sends a power-on instruction to the baseband processor. After receiving the power-on instruction, the baseband processor powers on a SIM card. After the SIM card is successfully powered on, a power-on response is fed back to the baseband processor. Optionally, the baseband processor sends the received power-on response to the application processor.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be configured to perform the audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset, to play audio by using the headset. This interface may be further configured to connect to another electronic device such as an AR device.

It may be understood that an interface connection relationship between modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communications solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite systems, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 can implement the photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 can play or record videos of a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to be connected to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to implement various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode by using the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a Cellular Telecommunications Industry Association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to a first pressure threshold is performed on a Messages icon, an instruction for creating an SMS message is executed.

The gyroscope sensor 180B may be configured to determine a motion posture of the electronic device 100. In some embodiments, angular velocities of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, and allows the lens to eliminate the shake of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 can detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitudes of accelerations of the electronic device 100 in various directions (usually on three axes), and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible to an external storage card. The electronic device 100 interacts with a network through the SIM card, to implement functions such as calling and data communications. In some embodiments, the electronic device 100 uses an eSIM, namely, an embedded SIM card. The eSIM card may be embedded into the electronic device 100, and cannot be separated from the electronic device 100.

In this application, the SIM card interface includes a card holder. The card holder is configured to place the SIM card, and there is an interruption pin on the card holder. When the SIM card is plugged into the SIM card interface, an electrical level of the interruption pin on the card holder increases. When the SIM card is unplugged from the SIM card interface, the electrical level of the interruption pin decreases. The electronic device determines, based on an electrical level change of the interruption pin, a time to power on the SIM card.

Figure 2:
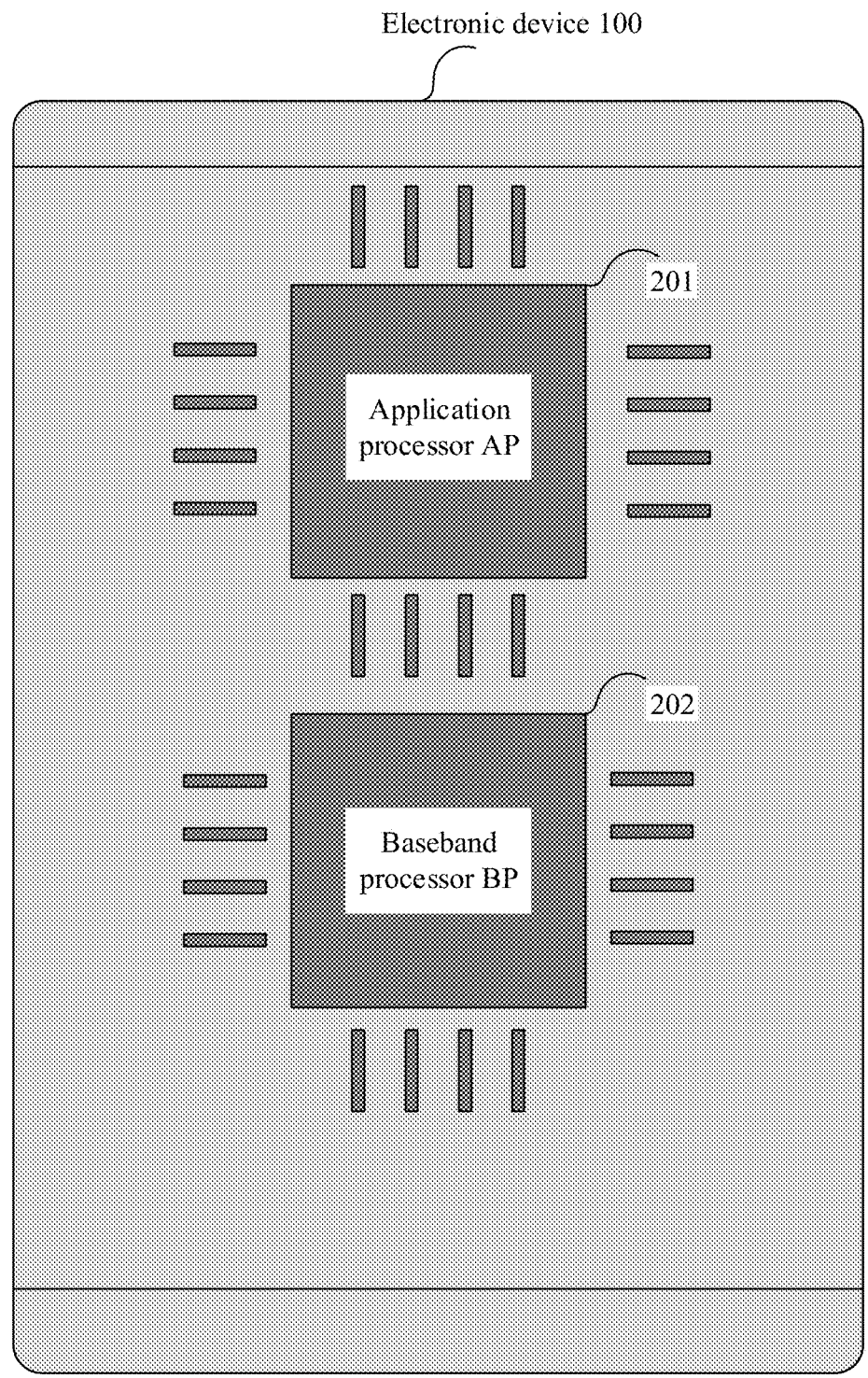
FIG. 2 is a schematic diagram of processors included in an electronic device according to an embodiment of this application.

FIG. 2 is a schematic diagram of processors included in the electronic device 100 according to an embodiment of this application.

As shown in FIG. 2, the processors of the electronic device 100 shown in FIG. 1 may be an application processor 201 (AP) and a baseband processor 202 (BP).

The AP is configured to run an operating system (for example, an Android system), a user interface, and an application. In this application, the AP may send the power-on instruction to the BP, so that the BP performs a power-on operation. The AP may further obtain status information of a modem and determine whether NV items for the SIM card are successfully stored, generate the power-on instruction to instruct the modem to power on the SIM card, generate a power-off instruction to instruct the modem to power off the SIM card, and generate a clock frequency adjustment instruction to instruct the modem to adjust a clock frequency of a clock signal provided to the SIM card.

The BP may include a modem (modem). The modem in the BP may be configured to communicate with a base station, perform data transmission with the AP, and control power-on and power-off of the SIM card. The modem may further receive the power-on instruction sent by the AP, and perform the power-on operation in response to the power-on instruction. The modem may further obtain a status of the SIM card and a status of a SIM card tray. Herein, the modem sends a command to the SIM card at an interval of a specific time (within 30 seconds specified in a protocol) to query the status of the SIM card. If the SIM card returns a response according to a first command, the modem reports a status of the SIM card that can be detected to the AP.

A software system that runs on the AP in the electronic device 100 may use a hierarchical architecture, an event-driven architecture, a microkernel architecture, a microservice architecture, or a cloud architecture. In embodiments of this application, an Android system of a layered architecture is used as an example to describe a software structure of the electronic device 100.

Figure 3:
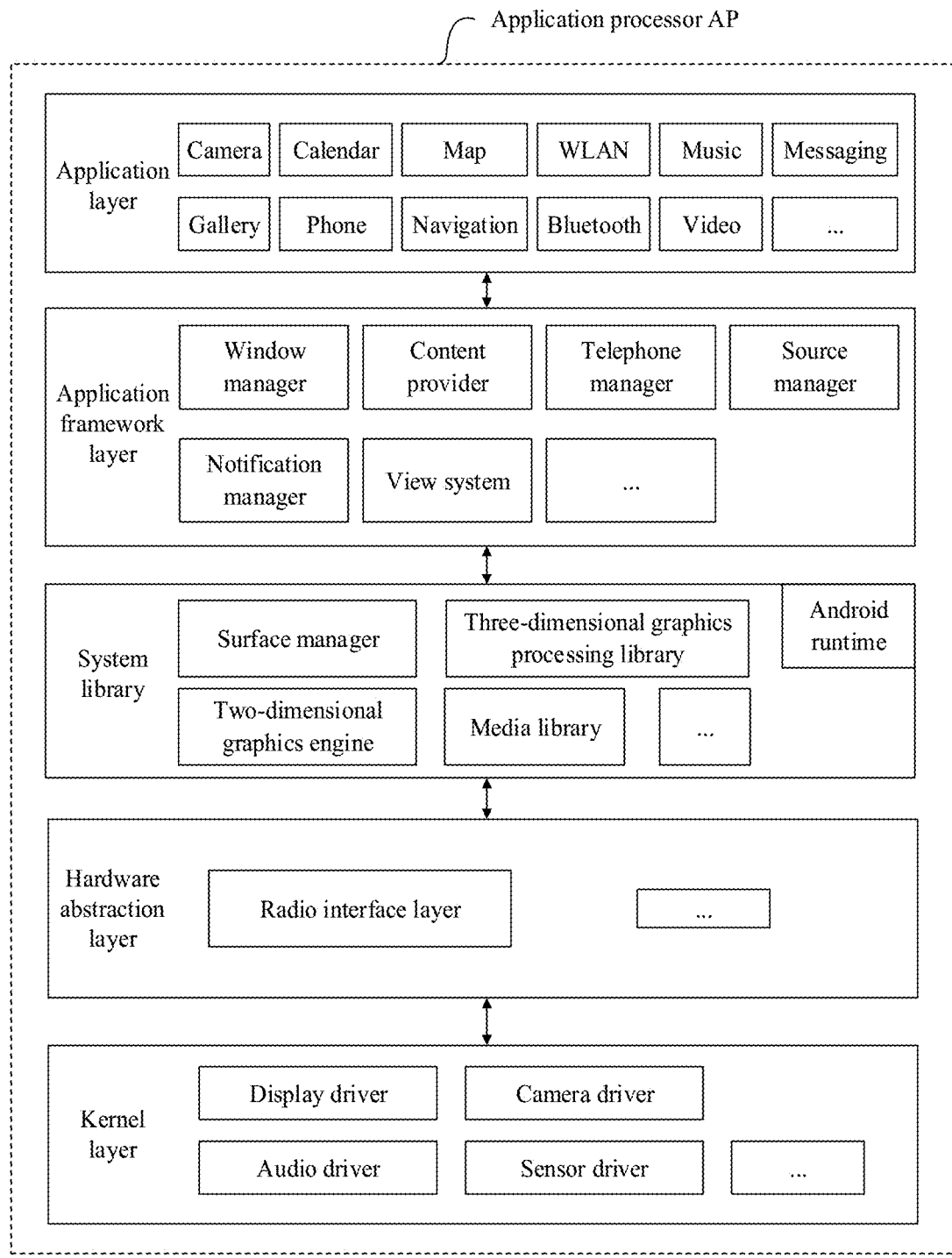
FIG. 3 is a block diagram of a software structure of an electronic device according to an embodiment of this application.

FIG. 3 is a block diagram of a software structure of the electronic device 100 according to an embodiment of this application.

In the layered architecture, software is divided into several layers, and each layer has a clear role and task. The layers communicate with each other through a software interface. In some embodiments, the Android system is divided into four layers from top to bottom: an application layer, an application framework layer, a system library based on Android runtime (Android runtime), a hardware abstraction layer, and a kernel layer.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in the java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules such as a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer is an interface layer between the kernel layer and the hardware. The hardware abstraction layer includes at least a radio interface layer (radio interface layer, RIL). The RIL is responsible for providing a telephone service. In this application, the RIL may send an instruction instructing to power on the SIM card to the modem.

The kernel layer is a layer between hardware and software. The kernel layer includes at least a display driver, a camera driver, an audio driver, and a sensor driver.

The following describes an example of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

Figure 4:
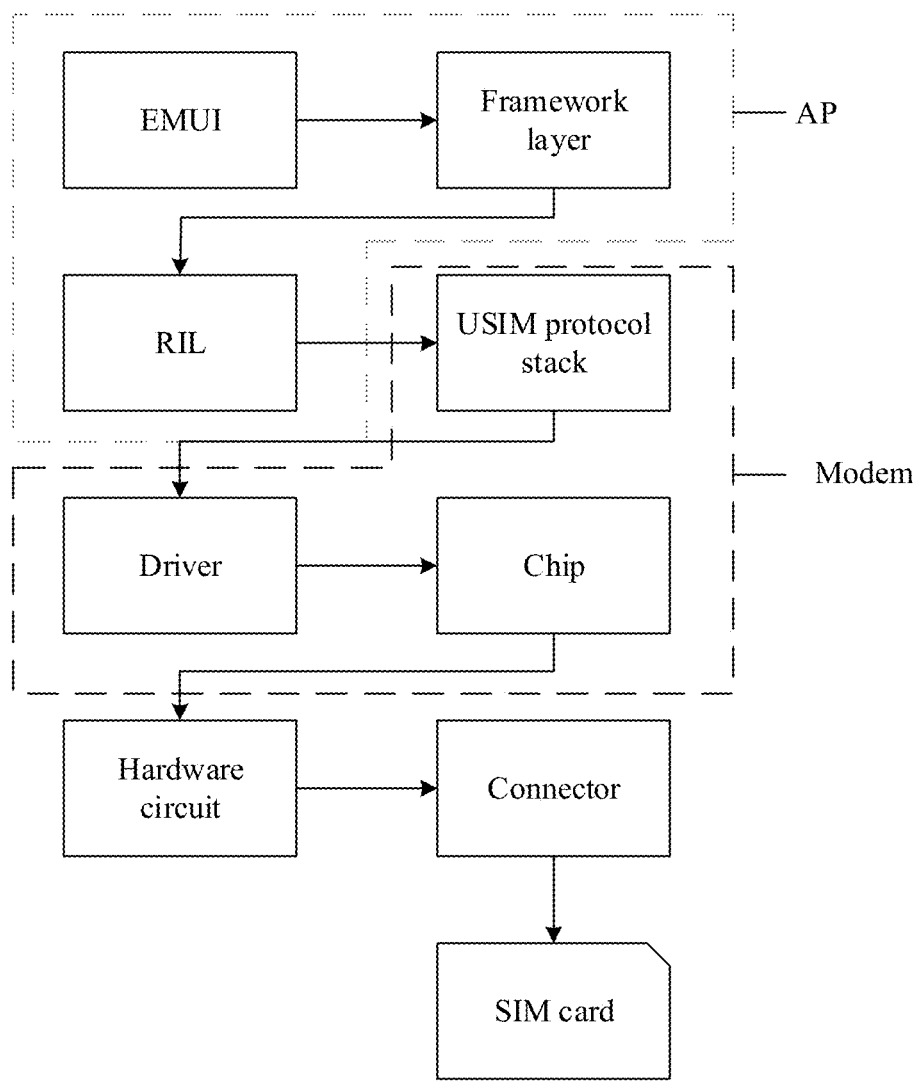
FIG. 4 is a schematic diagram of a software and hardware connection of an electronic device according to an embodiment of this application.

Refer to FIG. 1, FIG. 2, and FIG. 3. FIG. 4 is a schematic diagram of a software and hardware connection in the electronic device 100. An AP in FIG. 4 corresponds to the application processor shown in FIG. 2. A framework shown in FIG. 4 corresponds to the application framework layer shown in FIG. 2. An EMUI represents an operating system. A RIL in FIG. 4 corresponds to the radio interface layer shown in FIG. 3. The AP may include the EMUI, the framework, and the ML. The ML is connected to a modem. The modem shown in FIG. 4 may include a USIM protocol stack, a driver, and a chip. The modem is connected to a SIM card through a hardware circuit and a connector. The hardware circuit and the connector in FIG. 4 are located in the SIM card interface 195 in FIG. 1.

The following specifically describes a process of establishing communication between the SIM card and the electronic device. The electronic device 100 can provide 3G/4G/5G, a user call, and an SMS message service only when the SIM card is plugged into the electronic device 100, and the communication between the SIM card and the electronic device 100 can be implemented. The process of establishing communication between the SIM card and the electronic device may include: a power-on process of the SIM card, an answer-to-reset process of the SIM card, and a process of data exchange between the SIM card and the electronic device 100.

1. Power-on Process of the SIM Card

Figure 5:
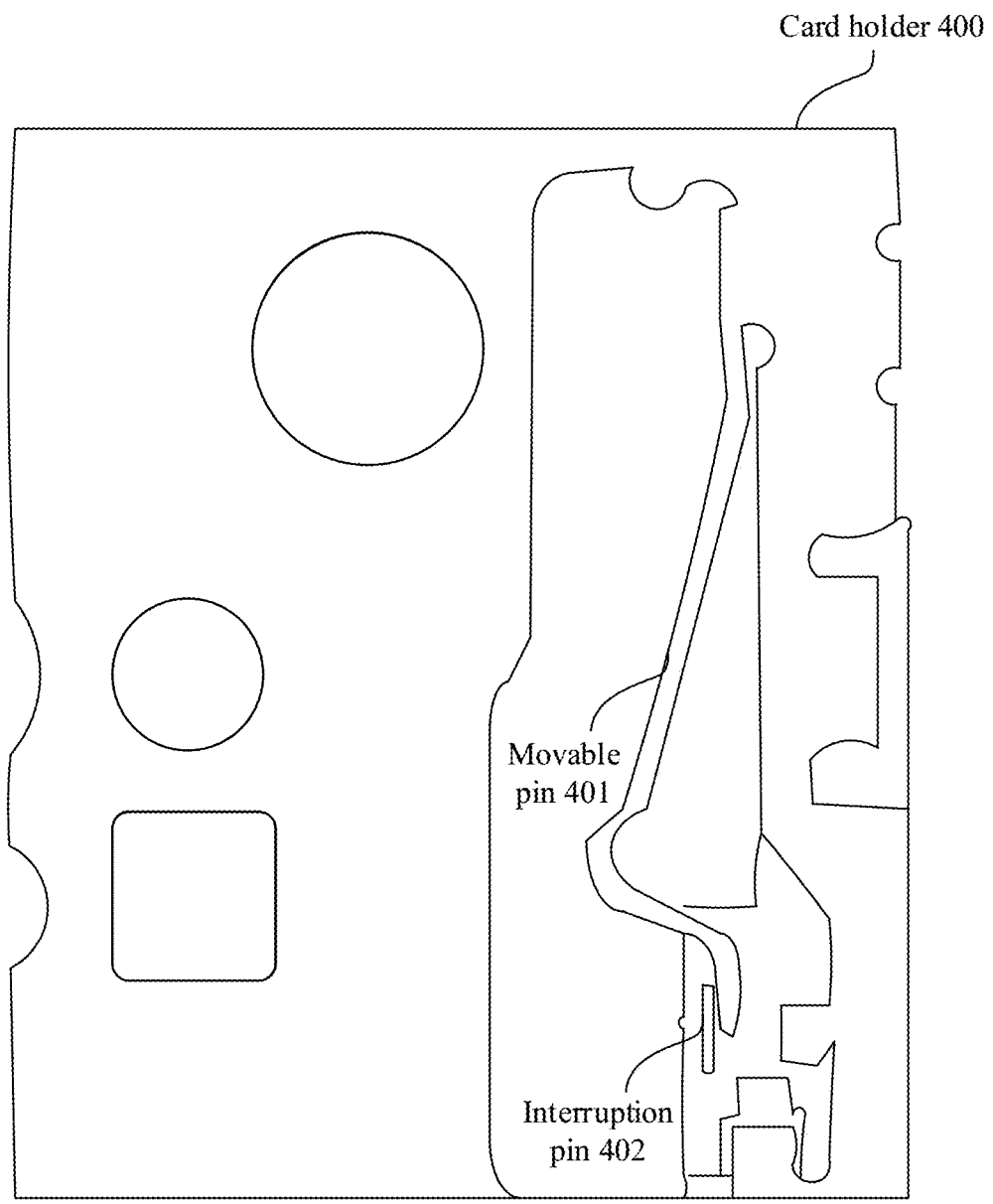
FIG. 5 is a schematic diagram of a structure of a card holder connected to a SIM card according to an embodiment of this application.

FIG. 5 is a schematic diagram of a structure of a card holder 400. The card holder 400 is configured to place the SIM card tray and the SIM card. The card holder 400 may include a movable pin 401 and an interruption pin 402. When the SIM card tray is plugged, the SIM card tray touches the movable pin 401, resulting in a change in contact between the movable pin 401 and the interruption pin 402. In this way, an electrical level of the interruption pin changes. A correspondence between the electrical level of the interruption pin and the status of the SIM card tray is shown in Table 1.

TABLE 1

Correspondence between the electrical level of the interruption pin and the status of the SIM card tray

| Electrical level of the interruption pin | Low electrical level 0 | High electrical level 1 | From low to high | From high to low |
|---|---|---|---|---|
| Status of the SIM card tray | The SIM card tray is not in place | The SIM card tray is in place | The SIM card tray is plugged | The SIM card tray is unplugged |

The electronic device 100 may determine, based on an electrical level change of the interruption pin, whether the SIM card is plugged or unplugged, to power on or power off the SIM card. Specifically, when detecting that the electrical level of the interruption pin changes from low to high, the electronic device 100 powers on the SIM card. Herein, the correspondence between the electrical level of the interruption pin and the status of the SIM card tray may be alternatively not limited to the correspondence shown in Table 1. The electrical level of the interruption pin may be alternatively set in reverse. The correspondence between the electrical level of the interruption pin and the status of the SIM card tray may be contrary to the correspondence shown in Table 1. For example, when the interruption pin is at a low electrical level, correspondingly, the SIM card tray is in the SIM card interface 195. When the electrical level of the interruption pin is a high electrical level, correspondingly, the SIM card tray is not in the SIM card interface 195. When the electrical level of the interruption pin changes from high to low, correspondingly, the SIM card tray is plugged into the SIM card interface 195. When the electrical level of the interruption pin changes from low to high, correspondingly, the SIM card tray is unplugged from the SIM card interface 195.

Figure 6:
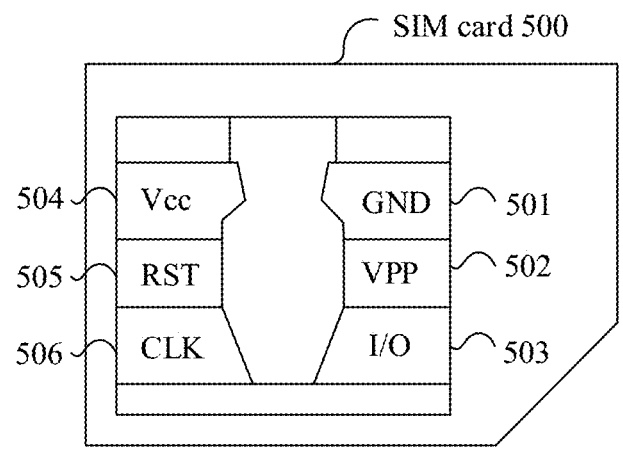
FIG. 6 is a schematic diagram of a SIM card according to an embodiment of this application.

FIG. 6 is a schematic diagram of a SIM card. The SIM card may include six pins: GND 501, VPP 502, I/O 503, Vcc 504, RST 505, and CLK 506. GND 501 is a ground terminal, VPP 502 is a programming voltage, I/O 503 is a data input/output terminal, Vcc 504 is a power supply voltage, RST 505 is a reset terminal, and CLK 506 is a clock. A process in which the electronic device 100 powers on the SIM card may specifically include: The electronic device 100 is connected to the pins of the SIM card, and reset of the pins of the SIM card is implemented. For a specific power-on process of the SIM card, refer to FIG. 7.

Figure 7:
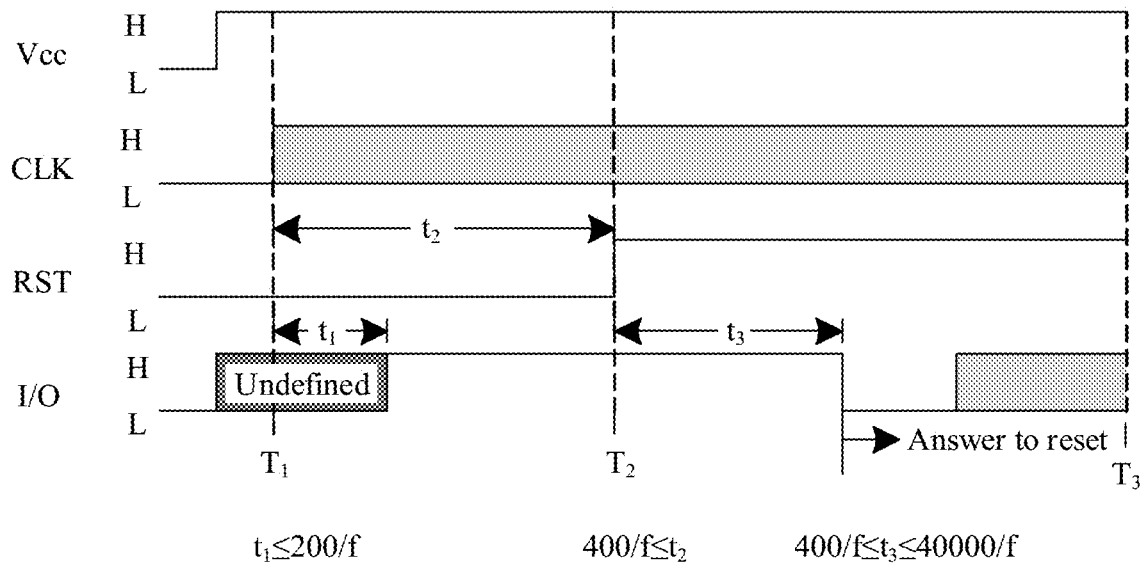
FIG. 7 is a diagram of a power-on sequence of a SIM card according to an embodiment of this application.

FIG. 7 is a schematic diagram of a power-on sequence of a SIM card. Before a moment T1, the electronic device 100 is connected to the pins of the SIM card. That the electronic device 100 is connected to the pins of the SIM card may specifically include the following steps.

a: The electronic device 100 sets RST 505 to a low electrical level (the low electrical level corresponds to a state L shown in FIG. 7).
  b: The electronic device 100 supplies power to Vcc 504 (a state of Vcc 504 is a state H shown in FIG. 7).
  c: The electronic device 100 sets I/O 503 to a receiving state (namely, a state H shown in FIG. 7).
  d: The electronic device 100 provides a stable clock signal to CLK 506 (a state of CLK 506 is a state H shown in FIG. 7).

After the pins of the SIM card are connected, reset of the SIM card starts. A reset process of the SIM card specifically includes the following steps.

a: The electronic device 100 adds the clock signal to the pin CLK 506 shown in FIG. 6 at the moment T1. I/O 503 of the SIM card is in a high-resistance state within 200 clock cycles (namely, a time period $t_2$ after the moment T1 in FIG. 7) after the clock signal is added to the pin CLK 506.
  b: I/O 503 starts to answer to reset within 400 to 40000 clock cycles (namely, a time period $t_3$ after a moment T2 in FIG. 7).
  c: If I/O 503 does not start to answer to reset within the 400 to 40000 clock cycles, RST 505 is set to a low electrical level at a moment T3. The electronic device 100 ends clock signal input on CLK 506 and sets I/O 503 to a state L (to be specific, a state in which data is not received). Finally, the electronic device sets Vcc 504 to a state L, namely, a low electrical level state.

2. Answer-to-Reset Process of the SIM Card

The answer-to-reset process of the SIM card is that the SIM card sends answer-to-reset information to the electronic device 100. The answer-to-reset information includes a type of a transmission protocol, a control parameter, and identification information. The answer-to-reset information includes a maximum of 32 bytes. A format of the answer-to-reset information is shown in Table 2.

TABLE 2

Format of the answer-to-reset information

| TS | T0 | TA1 | TB1 | TC1 | TD1 | TA2 | TB2 | TC2 | TD2 | ... | T1 | ... | TK | TCK |
|----|----|----|----|----|----|----|----|----|----|----|----|----|----|----|

In Table 2, TS is an initial character, and the SIM card needs to transmit the character in the answer-to-reset process. T0 is a format character, TAi to TDi are interface characters, and T1, ..., and TK are historical characters, with a maximum of 15 historical characters.

In the answer-to-reset process, a default parameter clock conversion factor F=372, a bit adjustment factor D=1, and an elementary time unit (elementary time unit, etu)=F/(f*D)= 372/f seconds are used. f is a clock frequency on CLK. If the clock frequency on CLK is 3.579 MHz, etu=372/3.579 MHz. In this case, a Baud rate=1/etu=9600 bps. A protocol indicated by parameters used by default during the answer-to-reset process is always used. The SIM card can generally support at least two protocols: F=372 and D=1; and F=512 and D=8. If TA1 in the answer-to-reset information sent to the electronic device 100 in the answer-to-reset process is not equal to '11', the electronic device initiates a protocol type selection (protocol type selection, PTS) process to perform protocol selection. When the PTS process succeeds, the default parameters are adjusted to F=512 and D=8. A correspondence that is between an operation frequency range f of the SIM card and the clock conversion factor F and that is defined in an ISO7816-3 protocol is shown in Table 3. In Table 3, "RFU" represents "reserved for use".

TABLE 3

Correspondence between the operation frequency range f and the clock conversion factor F

| Bits 8-5 | 0000 | 0001 | 0010 | 0011 | 0100 | 0101 | 0110 | 0111 |
|----------|------|------|------|------|------|------|------|------|
| F | 372 | 372 | 558 | 744 | 1116 | 1488 | 1860 | RFU |
| f | 4 | 5 | 6 | 8 | 12 | 16 | 20 | — |
| Bits 8-5 | 1000 | 1001 | 1010 | 1011 | 1100 | 1101 | 1110 | 1111 |
| F | RFU | 372 | 558 | 744 | 1116 | 1488 | RFU | RFU |
| f | — | 5 | 7.5 | 10 | 15 | 20 | — | — |

3. Process of Data Exchange Between the SIM Card and the Electronic Device 100

The process of data exchange between the SIM card and the electronic device 100 is that the SIM card receives a command sent by the electronic device 100, and responds to the command; or the SIM card sends a command to the electronic device, and receives a response from the electronic device 100. The command and the response in the process of data exchange between the SIM card and the electronic device 100 are carried by using application protocol data units (Application Protocol Data Unit, APDU). The APDUs are classified into a command APDU and a response APDU. Formats of the command APDU and the response APDU are respectively shown in Table 4 and Table 5.

TABLE 4

Format of the command APDU

| CLA | INS | P1 | P2 | P3 | DATA1 |
|---|---|---|---|---|---|

In Table 4, CLA is a command category. INS is command code. P1 and P2 are command parameters. P3 is a data length, and represents a quantity of data characters transmitted during command transmission. When data is sent from the SIM card, P3='00' represents that the data length is 256 characters. When data is sent from the electronic device 100, P3='00' represents that no data is transmitted.

TABLE 5

Format of the response APDU

| DATA2 | SW1 | SW2 |
|---|---|---|

In Table 5, SW1 and SW2 are status words, and represent whether the command is successfully executed. When SW1='90' and SW2='00', it represents that the command normally ends. When SW1='91' and SW2='XX', it represents that the SIM card needs to send the command to the electronic device 100. When SW1='9F' and SW2='XX', it represents that there is response data with a length XX. When SW1='94' and SW2='04', it represents that no file is found or a parameter is wrong. When SW1='6D' and SW2='00', it represents that there is an unknown instruction.

Herein, the electronic device 100 can read information in the SIM card by sending the command to the SIM card. The information in the SIM card mainly includes: an international mobile subscriber identity (International Mobile Subscriber Identity, IMSI), where the IMSI is used for access authentication; a mobile subscriber number (Mobile Subscriber International Directory Number, MSISDN); a key; a network identifier; a personal identification number; an unlock number; and the like.

Currently, normal communication of the SIM card cannot be implemented due to a reason of software and hardware of the electronic device or of the SIM card. Scenarios in which the normal communication of the SIM card cannot be implemented in this application may be summarized into three scenarios. The following specifically describes the three scenarios in which the normal communication of the SIM card cannot be implemented.

Scenario 1

The interruption pin of the SIM card holder in the electronic device 100 is abnormal (for example, the interruption pin is broken or a foreign matter exists at the interruption pin). When a user hot plugs the SIM card, the interruption pin cannot be triggered, and the electrical level of the interruption pin does not change with plugging or unplugging of the SIM card. Consequently, the electronic device cannot learn of whether the SIM card is plugged or unplugged. Therefore, the electronic device does not power on the SIM card when the SIM card is plugged. Consequently, the normal communication of the SIM card cannot be implemented, and the user cannot use the SIM card. This affects user experience.

Scenario 2

Figure 8A:
FIG. 8A and FIG. 8B are schematic diagrams of a group of user interfaces according to an embodiment of this application.
Figure 8B:
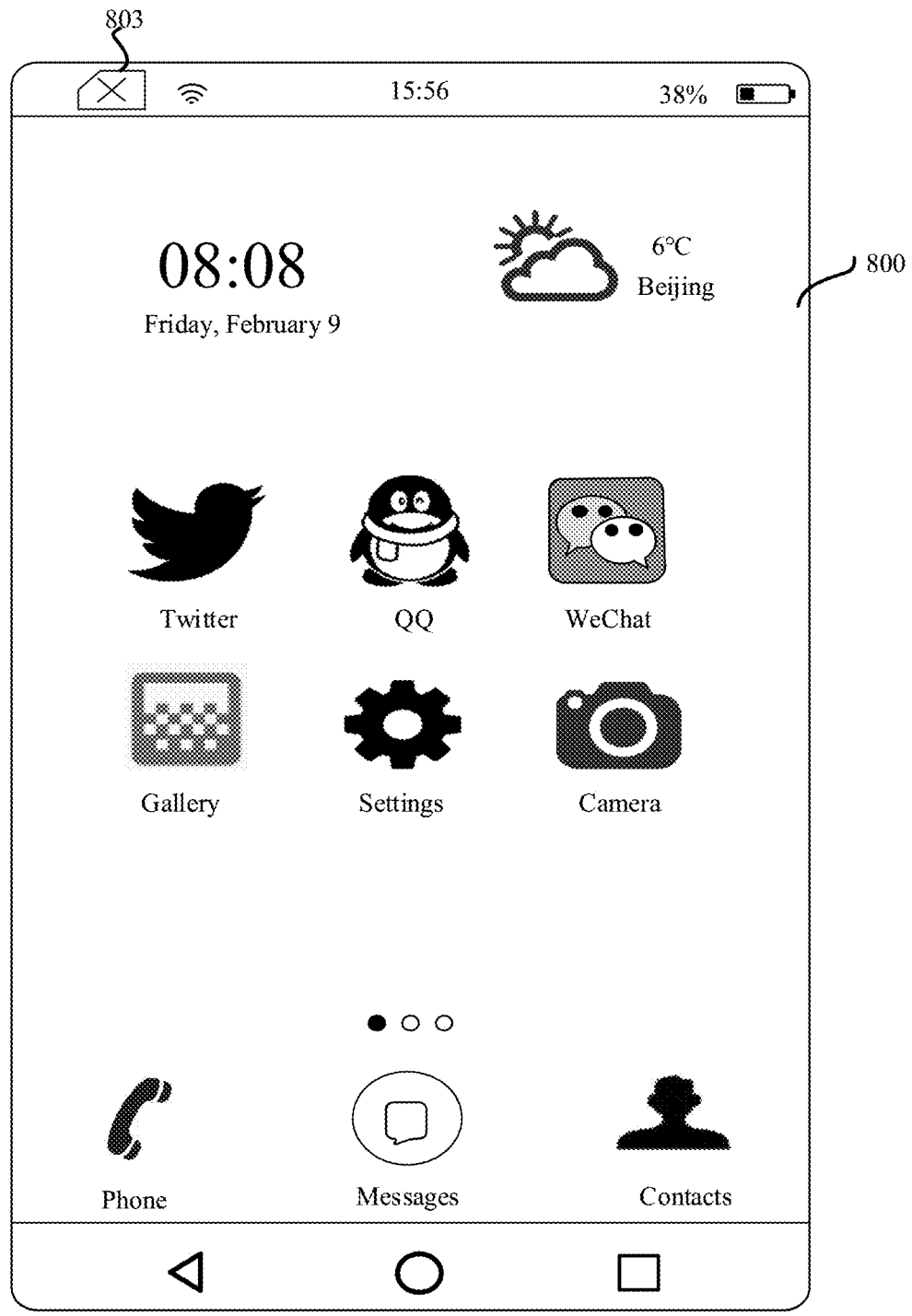

When abnormal data occurs during normal use of the SIM card, a SIM card detection failure occurs. As shown in a user interface 800 shown in FIG. 8A. An interface element 802 user interface 800 is one or more signal strength indicators of a mobile communication signal (also referred to as a cellular signal). An interface element 801 in the user interface 800 represents an indicator of an operator of the mobile communication signal. When the SIM card detection failure occurs, as shown in FIG. 8B, an interface element 803 is displayed on the user interface 800. The interface element 803 represents that the electronic device 100 currently does not detect the SIM card. In this case, the user cannot use a mobile communications network, and cannot make a call and text an SMS message.

The SIM card detection failure in this application means that the SIM card changes from being detected by the modem to being not detected by the modem. The SIM card detection failure includes Scenario 1 in which the electronic device does not timely power on the SIM card because the interruption pin is abnormal when the SIM card is hot plugged. The SIM card detection failure further includes Scenario 2 in which the SIM card suddenly cannot be detected by the modem during normal use.

Scenario 3

The SIM card needs to maintain normal communication by using a clock signal provided by the electronic device 100. A frequency (also referred to as a clock frequency) of the clock signal provided by the electronic device 100 to the SIM card should meet a standard protocol. Some SIM cards cannot operate at a specific clock frequency range. If the clock frequency provided by the electronic device 100 falls within a clock frequency range in which the SIM card cannot operate, data transmission between the SIM card and the electronic device 100 is affected. For example, abnormal data exchange occurs between the electronic device 100 and the SIM card. Table 6 shows an example of the abnormal data exchange between the electronic device 100 and the SIM card. When normal data exchange is performed between the electronic device 100 and the SIM card, the SW status words in the response should be '90' and '00'; and the SW status words in the response are '90' and '10' in an abnormal case shown in Table 6. In Table 6, according to the protocol, in an example of a row whose serial number is 2, underlined "42" in the data exchange is wrong, and a correct character should be "62". In examples with serial numbers 3 and 4, all underlined characters are incorrect. In this case, the user cannot use the mobile communications network, and cannot use the electronic device 100 to make a call and text an SMS message.

TABLE 6

Example of the abnormal data exchange between the electronic device 100 and the SIM card

| Serial number | Abnormal category | Example |
|---|---|---|
| 1 | When the SIM card is a UICC card, the SW status words are abnormal | 80 F2 00 0C 00<br>90 10<br>80 F2 00 0C 00<br>90 10<br>02 88 00 80 11<br>88<br>00 00 00 00 64 00 00 00 00 10 93<br>71 B8 80 00 00 00<br>61 61<br>02 C0 00 00 61<br>6C 6C<br>02 C0 00 00 6C<br>6C 6C |

TABLE 6-continued

Example of the abnormal data exchange between the electronic device 100 and the SIM card

| Serial number | Abnormal category | Example | | | | | | | | | | |
|---|---|---|---|---|---|---|---|---|---|---|---|---|
| 2 | Returned content is wrong | 00 A4 2F 61 00 C0 42 2F 91 3B 21 A0 A4 3F 9F | A4 00 1C C0 1A 00 1E 9E 04 A4 00 17 | 00 00 82 8A 94 66 00 | 04 00 05 01 80 86 00 | 02 1C 42 ... 1F ... 02 | 21 47 | 00 80 | 30 31 | 04 E0 | 83 73 | 02 BE |
| 3 | When the SIM card is an ICC card, the SW status words are abnormal | A0 A4 3F A0 67 A0 67 3B 21 A0 A4 3F 9F A0 67 A0 C0 00 00 90 | A4 3F 00 C0 67 C0 67 9E 04 A4 00 1F C0 17 C0 00 0A 10 | 00 00 00 00 00 94 66 00 00 00 00 93 | 00 00 00 00 80 86 00 00 00 F8 09 | 00 67 67 1F 02 1F 17 3F | 47 00 | 80 01 | 31 00 | E0 00 | 73 00 | BE 00 |
| 4 | Returned content is wrong during content reading | 00 A4 2F 61 00 C0 62 0! 90 00 B0 B0 90 | A4 E2 19 C0 17 00 B0 68 00 | 08 00 82 00 00 30 | 04 00 02 00 00 51 | 02 19 41 0A 42 | 83 25 | 02 27 | 2F 32 | E2 26 | 8A 24 | 01 |

In the conventional technology, for a case, described in Scenario 1, in which communication of the SIM card cannot be implemented, the user can recover the communication of the SIM card only by restarting the electronic device 100. Consequently, user experience is affected. For a problem, described in Scenario 3, that the normal communication of the SIM card cannot be implemented at the clock frequency provided by the electronic device, there is no method for recovering the communication of the SIM card in the conventional technology.

For a problem, described in Scenario 2, that the normal communication of the SIM card cannot be implemented because a card detection failure suddenly occurs during normal operation of the SIM card, in the conventional technology, the electronic device 100 first uses fast recovery (Fast Recovery) to recover the communication of the SIM card. If the communication of the SIM card is not successfully recovered through fast recovery, the electronic device 100 uses full recovery (Full Recovery) to recover the communication of the SIM card. The following briefly describes fast recovery and full recovery in the conventional technology.

1. Fast Recovery

Fast recovery is that the electronic device 100 powers on the SIM card when the SIM card detection failure occurs, to recover the communication of the SIM card. For the power-on process of the SIM card, refer to FIG. 6. Details are not described herein again. The electronic device 100 may continuously perform fast recovery on the SIM card for a plurality of times (generally no more than three times) without a time interval. The electronic device 100 successfully reads several key files (such as the IMSI) in the SIM card only when the SIM card returns the answer-to-reset information to the electronic device 100. In this way, the communication of the SIM card is successfully recovered after a fast recovery process. Fast recovery is performed by the modem in the electronic device 100, and this process is not reported to the AP of the electronic device.

2. Full Recovery

After fast recovery fails, the electronic device 100 starts a full recovery process to recover the communication of the SIM card. The electronic device 100 usually starts the full recovery process 30s after fast recovery fails. In the full recovery process, the power-on process of the SIM card is also performed once. In the full recovery process, the modem of the electronic device 100 reports a result of recovering the communication of the SIM card to the AP. When the SIM card returns the answer-to-reset information to the electronic device 100, the electronic device 100 successfully reads more key files (more than the key files read at the fast recovery stage) in the SIM card. In this way, the electronic device 100 successfully recovers the communication of the SIM card after the full recovery process.

The methods provided in the conventional technology can resolve only the problem that the communication of the SIM card cannot be implemented due to the SIM card detection failure in Scenario 2. To resolve the problems that the normal communication of the SIM card cannot be implemented in Scenario 1, Scenario 2, and Scenario 3, this application proposes a SIM card detection failure recovery method for an electronic device. When the problems that the normal communication of the SIM card cannot be implemented in Scenario 1 and Scenario 2 occur, the communication of the SIM card can be more effectively recovered according to the method proposed in this application. This application further proposes a SIM card power-on method for an electronic device. When the problem that the normal communication of the SIM card cannot be implemented in Scenario 3 occurs, the communication of the SIM card can be more effectively recovered according to the method proposed in this application.

Figure 9:
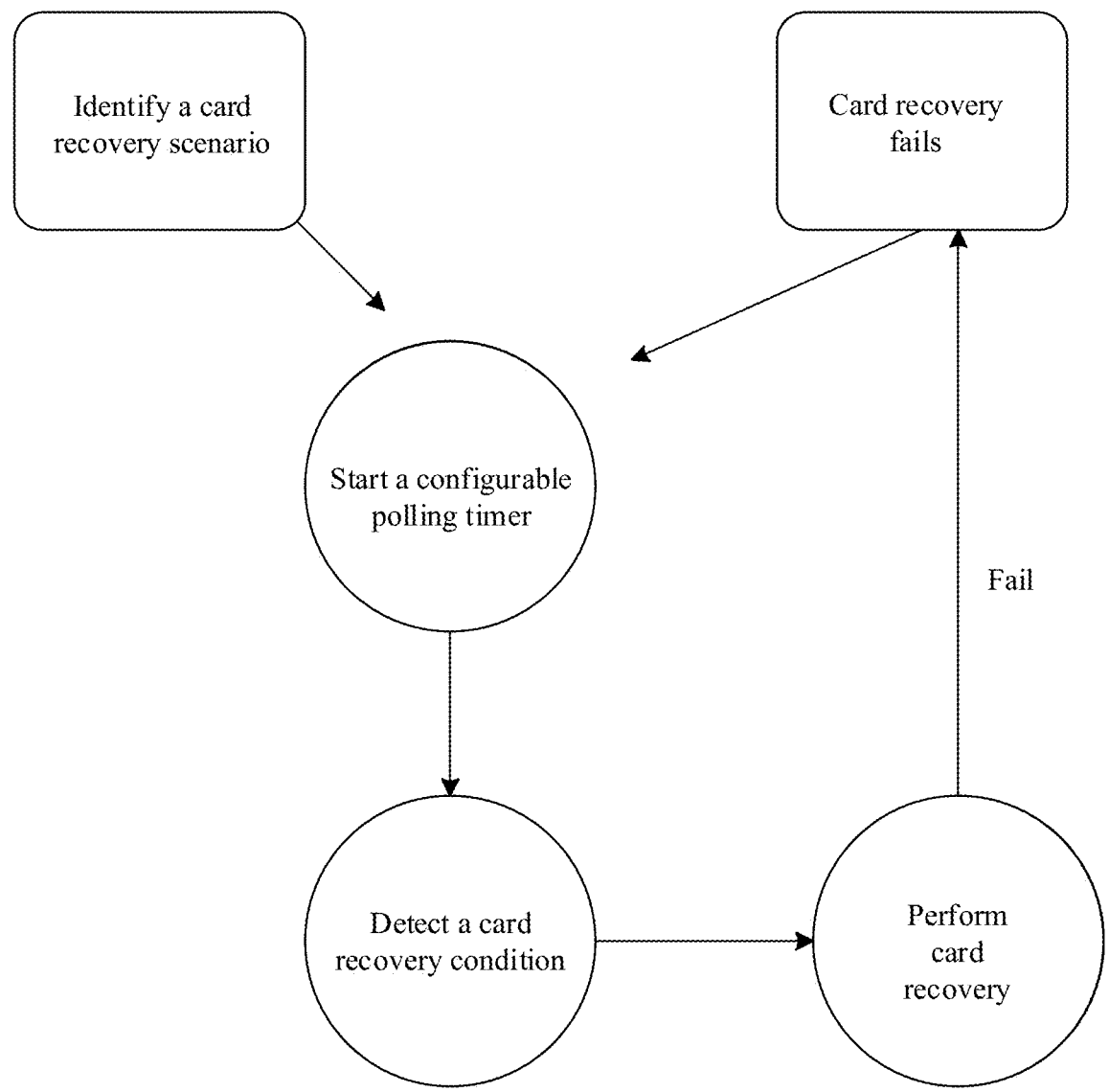
FIG. 9 is a schematic diagram of a SIM card detection failure recovery method for an electronic device according to an embodiment of this application.

The following briefly describes a SIM card detection failure recovery method for an electronic device proposed in this application. As shown in FIG. 9, the electronic device 100 first identifies a card recovery scenario. Card recovery herein means whether to power on a SIM card. A configurable timer is started based on the card recovery scenario. The electronic device periodically obtains, based on a time set by the timer, power-on information for powering on the SIM card. The electronic device determines a power-on condition of the SIM card based on the obtained power-on information. If the power-on condition is met, the electronic device 100 powers on the SIM card. If card recovery fails, the foregoing card recovery process is repeated.

Figure 10:
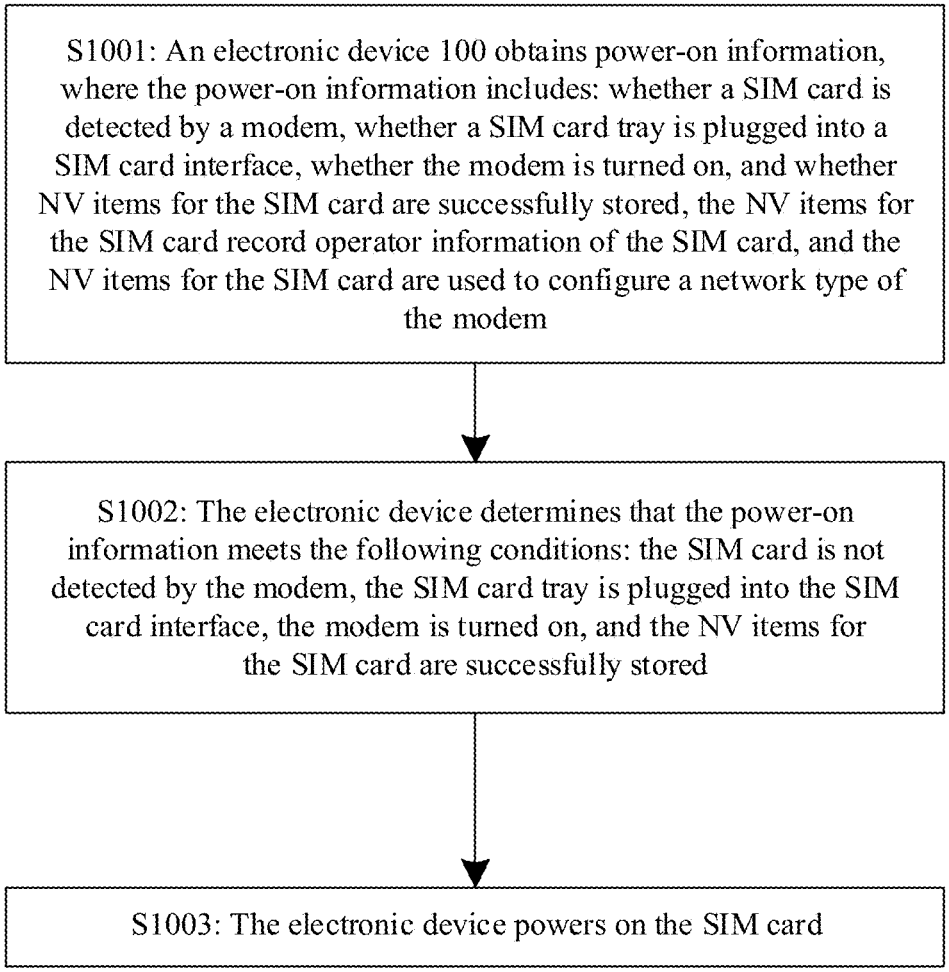
FIG. 10 is a flowchart of a SIM card detection failure recovery method for an electronic device according to an embodiment of this application.

Refer to FIG. 10. The following specifically describes a SIM card detection failure recovery method for an electronic device provided in an embodiment of this application. As shown in FIG. 10, a SIM card detection failure recovery method for an electronic device provided in this embodiment of this application may include the following steps.

S1001: An electronic device 100 obtains power-on information, where the power-on information includes: whether a SIM card is detected by a modem, whether a SIM card tray is plugged into a SIM card interface, whether the modem is turned on, and whether NV items for the SIM card are successfully stored; the NV items for the SIM card record operator information of the SIM card; and the NV items for the SIM card are used to configure a network type of the modem.

When a power supply input exists at a Vcc pin of the SIM card, and a stable clock signal input exists at a CLK pin of the SIM card, an I/O interface of the SIM card is set to be in a state in which interfacing can be implemented, so that the SIM card can report a status of the SIM card to the modem, and the modem can detect the SIM card. The modem can report the status of the SIM card to an application processor.

The SIM card tray is configured to place the SIM card, and then to be plugged into the SIM card interface. A status of the SIM card tray may be divided into a plugged state or an unplugged state. The electronic device 100 records the status of the SIM card tray when the electronic device 100 is turned on or when an electrical level of an interruption pin changes. When the electronic device 100 is turned on, and when the electrical level of the interruption pin is 1, the electronic device 100 records that the SIM card tray is in the plugged state. When the electrical level of the interruption pin is 0, the electronic device 100 records that the SIM card tray is in the unplugged state. When the SIM card is hot plugged, the modem determines the status of the SIM card tray based on an electrical level change of the interruption pin of a SIM card holder. When the electrical level of the interruption pin changes from a low electrical level to a high electrical level, the SIM card tray is in the plugged state. When the electrical level of the interruption pin changes from a high electrical level to a low electrical level, the SIM card tray is in the unplugged state. When the interruption pin is abnormal, the electrical level of the interruption pin does not change in a process in which the SIM card is hot plugged. In this case, the status of the SIM card tray that is obtained by the electronic device 100 is a status of the SIM card tray when the electronic device 100 is turned on. The modem in the electronic device 100 records the status of the SIM card tray in a kernel layer based on the electrical level or the electrical level change of the interrupt pin. Then, a radio interface layer obtains the status of the SIM card tray from the kernel layer.

A status of the modem may be that the modem is turned on or off. The radio interface layer in the electronic device 100 can obtain the status of the modem based on a report of the modem. When the modem is turned on, the modem provides an interface to the application processor, and the modem can receive a power-on instruction and a power-off instruction sent by the application processor, read instructions of a file, and the like through the interface. The modem may power on the SIM card according to the power-on instruction sent by the application processor. The modem may further power off the SIM card according to the power-off instruction sent by the application processor. When the modem is turned on, the modem may perform network selection based on the NV items stored for the SIM card. When the modem is turned on, the modem may access a network for registration. When the modem is turned on, the modem has a radio frequency communication capability. Herein, when the modem is turned on, there is a function of detecting whether the SIM card is connected to the modem.

The electronic device 100 detects that the SIM card is plugged, and the electronic device 100 may write, in non-volatile storage, NV items related to an operator of the SIM card and networks supported by the SIM card. The electronic device 100 configures the modem by using these NV items. The modem performs network type selection based on the operator and the networks supported by the SIM card that are recorded in the NV items. When the NV items indicate that the operator of the SIM card is China Mobile and the SIM card supports 2G, 3G, and 4G networks, network types configured on the modem should be three networks: GSM (2G), TD-SCDMA (3G), and TD-LTE (4G). When the NV items indicate that the operator of the SIM card is China Unicom and the SIM card supports 2G, 3G, and 4G networks, network types configured on the modem should be GSM (2G), WCDMA (3G), TD-LTE (4G), and FDD-LTE (4G). When the NV items indicate that the operator of the SIM card is China Telecom and the SIM card supports 2G, 3G, and 4G networks, network types configured on the modem should be CDMA1X (2G), EVDO (3G), TD-LTE (4G), and FDD-LTE (4G). In the NV items, a network that allows the electronic device 100 to register, a network that the electronic device 100 is currently registered, and the like are labeled. For example, a 3G network of the China Unicom is labeled in the NV items in the electronic device 100. If a plugged SIM card is a card of the China mobile, the electronic device 100 cannot find a network signal. When information related to a communication function of the SIM card is written in the electronic device 100, a communication function of the electronic device 100 is not affected. The NV items can further record a radio frequency parameter. The electronic device 100 may configure a radio frequency parameter of the modem based on the radio frequency parameter recorded in the NV items. If the NV items for the SIM card are not successfully stored, the electronic device 100 restarts the modem and powers off the SIM card. There are some NV items related to the SIM card. When the SIM card needs to be powered off or the modem needs to be restarted, the electronic device can complete configuration related to the NV items. In this application, the SIM card needs to be powered on when the NV items are successfully stored. In this way, a normal power-off process of the SIM card can be prevented from being interfered with.

In a possible implementation, that the electronic device 100 obtains power-on information specifically includes: When the SIM card changes from being detected by the modem to being not detected by the modem, the electronic device 100 obtains the power-on information. When the modem detects a change in the status of the SIM card, the SIM card changes from being detected to being not detected. In this way, the electronic device 100 determines that a SIM card detection failure occurs. The electronic device 100 starts to obtain the power-on information. In this way, a SIM card detection failure recovery procedure can be timely triggered.

Further, when the SIM card changes from being detected by the modem to being not detected by the modem, the electronic device 100 obtains the power-on information after a first preset value. In this way, when the SIM card is hot plugged, the electronic device 100 can be prevented from obtaining the power-on information before the SIM card is plugged into the SIM card interface. In this way, when the SIM card is not plugged, power consumption wasted by performing the SIM card detection failure recovery procedure can be reduced.

Further, a first timer may be disposed in the electronic device 100 to time the first preset value. When a time on the timer changes from the first preset value to 0, the electronic device 100 starts to obtain the power-on information. In this way, the SIM card detection failure recovery procedure can be more accurately and timely started.

In a possible implementation, when the electronic device 100 detects that a process that is in the application processor and that is used to control the modem to power-on and power-off the SIM card is started, the electronic device obtains the power-on information. In this way, it may be determined that the application processor in the electronic device is in a state in which the power-on information can be obtained.

S1002: The electronic device determines that the power-on information meets the following conditions: the SIM card is not detected by the modem, the SIM card tray is plugged into the SIM card interface, the modem is turned on, and the NV items for the SIM card are successfully stored.

Specifically, the radio interface layer in the application processor determines that the modem is turned on, the card tray is plugged, the SIM card is not detected by the modem, and the NV items for the SIM card are successfully stored. That is, when the card tray is in the plugged state, the SIM card is in the card tray but the modem cannot detect the SIM card, and the modem normally operates, the radio interface layer sends the power-on instruction to the modem. The modem starts to power on the SIM card after receiving the power-on instruction. The NV items for the SIM card are successfully stored. In this way, the modem can be restarted because the NV items are not successfully stored, and can power off the SIM card. That is, when the modem is restarted because the NV items are not successfully stored, and when the modem powers off the SIM card, the solution of this application does not interfere with a process in which the modem normally powers off the SIM card.

S1003: The electronic device 100 powers on the SIM card.

The radio interface layer in the electronic device 100 receives the power-on instruction for the modem. The modem powers on the SIM card after receiving the power-on instruction. For power-on of the SIM card, refer to the foregoing description of the power-on process of the SIM card. Details are not described herein again.

If the electronic device 100 receives power-on reply information of the SIM card, the electronic device 100 determines that the SIM card is successfully powered on, and the communication of the SIM card is recovered.

In a possible implementation, that the electronic device 100 powers on the SIM card includes: The electronic device 100 detects that an airplane mode is not enabled; when the airplane mode is enabled, a radio frequency communication function of the modem is disabled; and the electronic device 100 powers on the SIM card. When the airplane mode is enabled, the radio frequency communication function of the modem is disabled, and the electronic device cannot use a mobile cellular network, cannot make a call, and cannot text an SMS message. In this case, the SIM card does not need to be powered on, and the SIM card detection failure recovery procedure can be simplified. Further, when the airplane mode is enabled, the electronic device 100 does not power on the SIM card, thereby reducing power consumption of the electronic device.

In a possible implementation, that the electronic device 100 powers on the SIM card includes: The electronic device 100 detects that a display is on, and the electronic device 100 powers on the SIM card. The electronic device 100 powers on the SIM card only when the display is on. When the display is off, the electronic device 100 does not power on the SIM card. This can reduce power consumption.

Further, that the electronic device 100 powers on the SIM card includes: When the electronic device 100 detects that a battery level is less than a first threshold, the electronic device does not power on the SIM card. Herein, the first threshold may be 1%, 5%, or the like, and is not limited. In this way, power consumption can be reduced when the battery level of the electronic device 100 is low.

In a possible implementation, that the electronic device 100 powers on the SIM card includes: When the electronic device 100 detects that the display is off, the electronic device obtains the battery level of the electronic device; and the electronic device 100 powers on the SIM card when the battery level is higher than a second threshold. Herein, the second threshold may be 30%, 40%, 50%, or the like, and is not limited. In this way, it can be ensured that the electronic device powers on the SIM card and affects normal use of the electronic device.

An embodiment of this application provides a SIM card detection failure recovery method for an electronic device. The electronic device obtains power-on information, where the power-on information includes: Whether a SIM card is detected by a modem, whether a SIM card tray is plugged into a SIM card interface, whether the modem is turned on, and whether NV items for the SIM card are successfully stored; the NV items for the SIM card record operator information of the SIM card; and the NV items for the SIM card are used to configure a network type of the modem. The electronic device determines that the power-on information meets the following conditions: The SIM card is not detected by the modem, the SIM card tray is plugged into the SIM card interface, the modem is turned on, and the NV items for the SIM card are successfully stored. The electronic device powers on the SIM card. In the two SIM card detection failure scenarios, namely, Scenario 1 in which when the SIM card is hot plugged, the interruption pin is out of operation, and Scenario 2, SIM card detection failure recovery can be more effectively implemented according to the method provided in this embodiment of this application.

With reference to the method for recovering the communication of the SIM card in this application, an example is used to describe an operation procedure of software and hardware of the electronic device 100.

Figure 11:
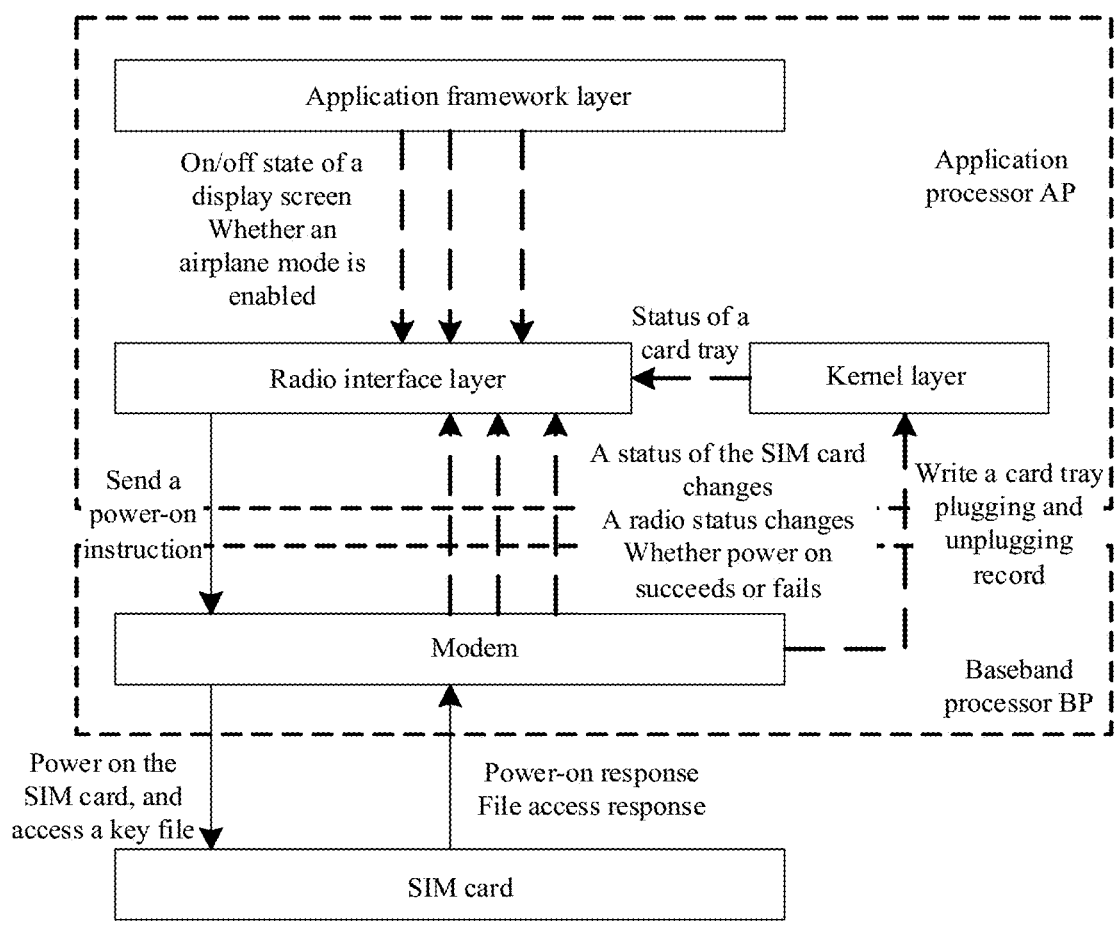
FIG. 11 is a schematic diagram of implementing a SIM card detection failure recovery method for an electronic device in this application by using software and hardware of an electronic device according to an embodiment of this application.

Refer to FIG. 11. An application framework layer, a radio interface layer, and a kernel layer in FIG. 11 respectively correspond to the application framework layer, the radio interface layer, and the kernel layer in FIG. 3. An application processor AP and a baseband processor BP in FIG. 11 correspond to the application processor AP and the baseband processor BP in FIG. 2. The application processor AP may include an application framework layer and a radio interface layer. The baseband processor BP may include a modem.

The application framework layer is responsible for obtaining a status of a display and determining whether an airplane mode is enabled. The application framework layer sends the obtained status of the display and an enabled state or a disabled state of the airplane mode to the radio interface layer.

The radio interface layer is configured to obtain status information of the display and information about whether the airplane mode is enabled. The radio interface layer further obtains a status (plugged or unplugged) of the card tray from the kernel layer. The radio interface layer further obtains, from the modem, an on or off state of the modem, a disabled state (corresponding to a radio state change in FIG. 11) of a radio frequency communication function of the modem when the airplane mode is enabled, a status of the SIM card, and a message indicating that power-on succeeds or fails. The radio interface layer further determines whether obtained power-on information (for example, the status of the display, the status of the card tray, and the status of the SIM card) meets power-on conditions (the card tray is plugged, the SIM card is not in place, the modem is turned on, and the NV items for the SIM card are successfully stored). If the power-on conditions are met, the radio interface layer delivers a power-on instruction to the modem.

The kernel layer is configured to record whether the card tray is in a plugged state or an unplugged state.

The modem is configured to receive the power-on instruction of the radio interface layer, and power on the SIM card in response to the power-on instruction. The modem further reports the message indicating that power-on of the SIM card succeeds or fails to the radio interface layer. The modem may further obtain an electrical level of an interruption pin of the SIM card interface and a change in the electrical level of the interruption pin, and write the status of the card tray into the kernel layer based on the electrical level of the interruption pin or the change in the electrical level of the interruption pin. The modem may further obtain the status of the SIM card and report the status of the SIM card to the radio interface layer.

An embodiment of this application provides a SIM card detection failure recovery method for an electronic device. The electronic device obtains power-on information, where the power-on information includes: Whether a SIM card is detected by a modem, whether a SIM card tray is plugged into a SIM card interface, whether the modem is turned on, and whether NV items for the SIM card are successfully stored; the NV items for the SIM card record operator information of the SIM card; and the NV items for the SIM card are used to configure a network type of the modem. The electronic device determines that the power-on information meets the following conditions: The SIM card is not detected by the modem, the SIM card tray is plugged into the SIM card interface, the modem is turned on, and the NV items for the SIM card are successfully stored. The electronic device powers on the SIM card. In the two SIM card detection failure scenarios, namely, Scenario 1 in which when the SIM card is hot plugged, the interruption pin is out of operation, and Scenario 2, SIM card detection failure recovery can be more effectively implemented according to the method provided in this embodiment of this application.

In this embodiment of this application, for the problem, described in Scenario 3, that the communication of the SIM card cannot be implemented due to the clock frequency range, set by the SIM card, in which the SIM card can operate, this application further proposes a SIM card communication recovery method.

Figure 12:
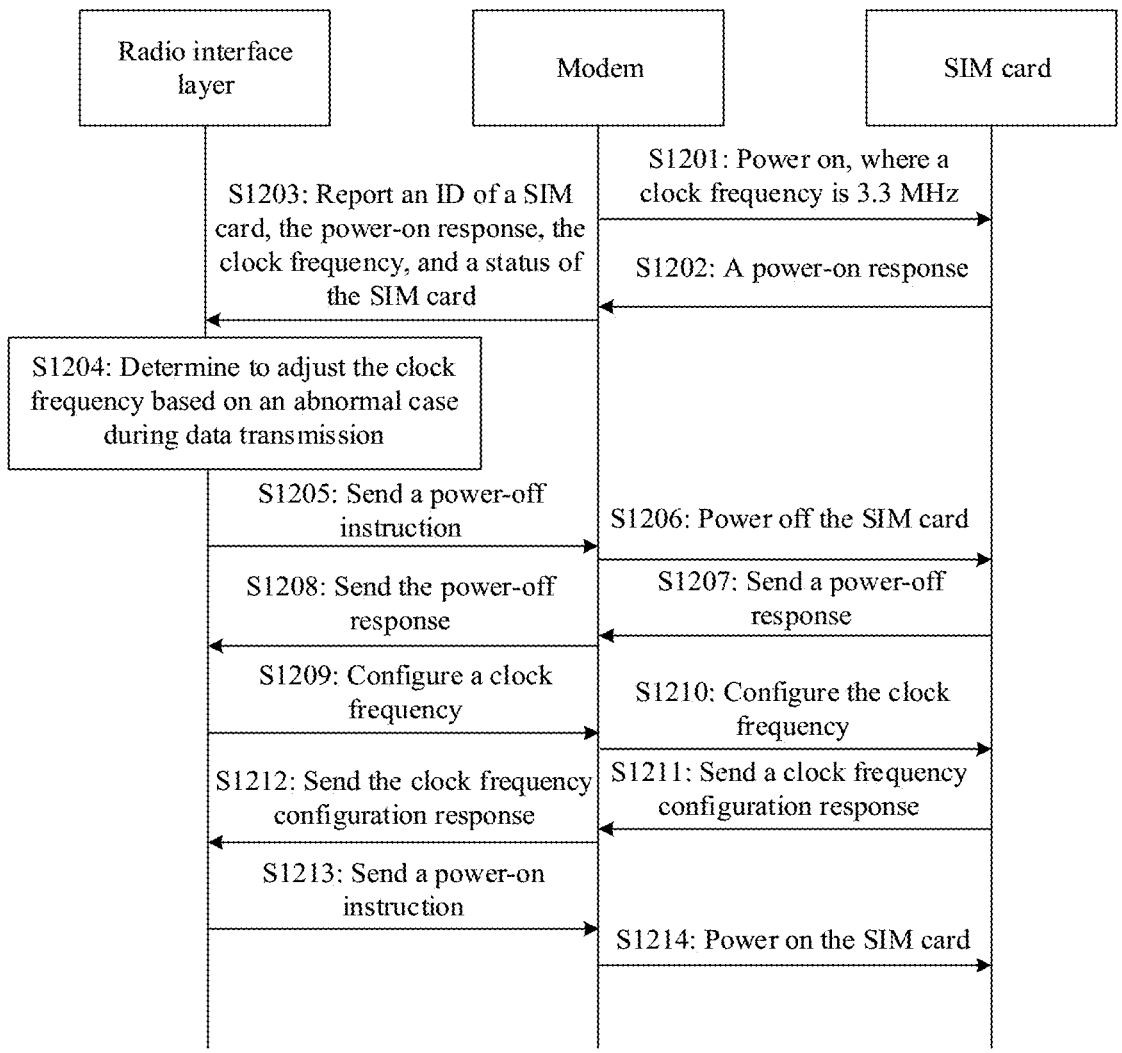
FIG. 12 is a schematic interaction diagram of a SIM card power-on method for an electronic device according to an embodiment of this application.

Refer to FIG. 12. The following specifically describes another SIM card communication recovery method proposed in this application. The method includes the following steps.

S1201 and S1202 form a power-on process of a SIM card.

S1201: A modem powers on the SIM card, where a clock frequency provided by the modem to the SIM card is a first frequency, and the first frequency may be 3.3 MHz.

The modem provides a clock signal of the first frequency to the SIM card, and the first frequency may be 3.3 MHz.

The first frequency may be alternatively another value. This is not limited herein. For a process in which the modem powers on the SIM card, refer to the power-on sequence of the SIM card shown in FIG. 6. Details are not described herein again.

S1202: The SIM card returns a response indicating that power-on succeeds.

For how to return a power-on response of the SIM card, refer to the foregoing description of the answer-to-reset process of the SIM card. Details are not described herein again.

S1203: The modem sends an ID of the SIM card, the power-on response, the clock frequency of the SIM card, and a status of the SIM card to a radio interface layer.

The radio interface layer receives information sent by the modem, such as the ID of the SIM card, the power-on response, the clock frequency at which the SIM card operates, and the status of the SIM card. The radio interface layer may report the status of the SIM card to an application framework layer. In this way, a user interface of an electronic device 100 displays the status of the SIM card.

A clock frequency that may be provided by the modem to the SIM card is determined by a chip in the modem. Frequency division may be performed on the clock frequency provided by the modem to the SIM card. To be specific, frequency division may be performed on the clock frequency provided by the modem to the SIM card based on a plurality of stages. For example, the clock frequency may be divided into a divide-by-two frequency, a divide-by-four frequency, and a divide-by-six frequency. Different chip manufacturers have different frequencies obtained through frequency division. This is not limited herein.

The modem has a smart card interface (smart card interface, SCI). The SCI may be configured to control the modem to select a frequency to be provided to the SIM card. The electronic device may define two data structures in the SCI to represent different clock frequencies. For example, as shown in Table 7, SCI 0 represents a clock frequency, and SCI 1 represents a clock frequency.

TABLE 7

| Data structures defined in the SCI | | | |
| --- | --- | --- | --- |
| uchar | uchar | uchar | uchar |
| sci0_clk | sci1_clk | rfu0 | rfu1 |

Each modem in the electronic device may select, by using a data structure defined in the SCI, a clock frequency provided to the SIM card. Currently, the SCI provides two clock frequencies that can be switched, such as 3.3 MHz and 3.95 MHz. Herein, a quantity of clock frequencies that can be provided in the SCI and that can be switched may be more. This is not limited in this application. When an NV value used to configure the clock frequency provided by the modem to the SIM card is 0, the clock frequency provided by the modem to the SIM card is 3.3 MHz. When the NV value used to configure the clock frequency provided by the modem to the SIM card is 1, the clock frequency provided by the modem to the SIM card is 3.95 MHz. Usually, in the electronic device, the NV value used to configure the clock frequency provided by the modem to the SIM card is 0 by default. When the electronic device is turned on and before the SIM card is powered on, the SCI in the modem needs to read the value of the NV item, to configure the clock frequency provided by the modem to the SIM card.

When powering on the SIM card, a universal subscriber identity module in the modem actively reports a current clock frequency of a card slot, an ATR of the card, and an abnormal authentication instruction status word (an abnormal response code stream when the SIM card performs an authentication operation on a terminal) to the AP side by using an AT command, and provides an AT instruction for setting the clock frequency to the AP side.

S1204: The radio interface layer determines to adjust the clock frequency based on an abnormal case during data transmission.

When the radio interface layer is turned on, a product model of the SIM card is read to precisely control a product range in which the solution takes effect, and property control is added.

The radio interface layer defines an array of answer-to-reset (answer to reset, ATR) information indicating that a clock frequency needs to be adjusted. In the array, answer-to-reset information returned by some SIM cards that cannot operate at the clock frequency provided by the electronic device to the SIM card by default is preset. The answer-to-reset information may be "3B XXXXXXXXXXXXXXX".

In a possible implementation, the application processor determines whether first reset information sent by the SIM card is consistent with second answer-to-reset information stored in the application processor; and if the first reset information sent by the SIM card is consistent with the second answer-to-reset information stored in the application processor, the application processor sends an instruction to enable the modem to adjust a clock frequency provided to the SIM card. The second answer-to-reset information indicates that a clock frequency range in which the SIM card can operate does not match the clock frequency provided by the modem.

When the electronic device is turned on or the SIM card is plugged and unplugged, for a safety reason, the SCI always operates at a default clock frequency (for example, 3.3 MHz). The electronic device 100 obtains and records the current clock frequency and the ATR of the card slot by using card information reported by the modem by using the AT command. After a command report indicating the status of the SIM card is received, logical determining is performed on whether the clock frequency of the SIM card may be abnormal.

If the current ATR of the SIM card belongs to a preset abnormal card ATR list, and if (a) the SIM card is not identified, and the status reported by the modem is unavailable, or (b) the SIM card is a UICC card but is identified as an ICC card, clock frequency adjustment is immediately performed. The RIL counts a quantity of abnormal times of the authentication status word that are actively reported by the modem; and if the quantity of the abnormal times of the authentication status word reaches a specific threshold (an example of setting the threshold is that the authentication status word is abnormal for three times within two minutes), clock frequency adjustment is performed, and the counted quantity is cleared.

In a possible implementation, if a status word of network access authentication from the SIM card is different from a first status word, the electronic device powers off the SIM card, where the first status word indicates that the SIM card can communicate with a base station under a clock signal provided by the electronic device.

When the abnormal case shown in FIG. 6 occurs during the data transmission process of the electronic device 100 and the SIM card, when the SIM card is not identified and the status reported by the modem to the radio interface layer is that the modem is in an off state, when the SIM card is a UICC card but is identified as an ICC card, or when the counted quantity of the abnormal times of the status word reaches the specific threshold (for example, the status word is abnormal for three times within two minutes), the radio interface layer in the electronic device 100 determines to start to adjust the clock frequency of the SIM card.

Herein, the electronic device 100 can identify whether the SIM card is a UICC card or an ICC card based on a byte in the answer-to-reset information returned by the SIM card.

S1205 to S1208 form a power-off process of the SIM card.

S1205: The radio interface layer sends a power-off instruction to the modem.

Herein, the power-off instruction may be an AT command. Power-off instructions sent by the radio interface layer to modems provided by different manufacturers are different. This is not limited herein.

S1206: The modem powers off the SIM card according to the power-off instruction sent by the radio interface layer.

The modem sets a Vcc pin and an RST pin of the SIM card to a low electrical level state. The modem ends a clock signal input on a CLK pin of the SIM card.

S1207: The SIM card sends a power-off response to the modem.

The SIM card can send a character "OK" to the modem to represent that the SIM card is successfully powered off.

In a possible implementation, that the electronic device powers on the SIM card, and if a status word of network access authentication from the SIM card is different from a first status word, the electronic device powers off the SIM card includes: The electronic device powers off the SIM card by using the modem, and the application processor intercepts a status of the SIM card that is sent by the modem. When the SIM card is powered off, the application processor intercepts the status of the SIM card that is sent by the modem. In this way, prompt information, for example, prompt information indicating that the SIM card is not detected, does not occur on the user interface. In this way, a user does not restart a mobile phone or hot plugs the SIM card because the user sees the prompt information. This affects user experience. In this case, power-off information for the SIM card is intercepted, and the SIM card is powered on without perception of the user. In this way, user experience can be improved.

S1208: The modem sends the received power-off response to the radio interface layer.

S1209 to S1212 form a clock frequency configuration process of the SIM card.

S1209: The radio interface layer sends a clock frequency configuration instruction to the modem.

S1210: The modem configures a clock frequency for the SIM card in response to the clock frequency configuration instruction sent by the radio interface layer.

The modem provides a plurality of clock frequencies such as 3.3 MHz and 3.95 MHz. The modem replaces a frequency of the SIM card corresponding to an initial process, to be specific, adjusts a first frequency to a second frequency. The first frequency is different from the second frequency. For example, the first frequency is 3.3 MHz, and the second frequency is 3.95 MHz. The modem uses a replaced clock frequency, to be specific, provides a clock signal of the second frequency to the SIM card.

S1211: The SIM card sends a clock frequency configuration response to the modem.

The SIM card sends the clock configuration response to the modem, to notify the modem of whether the clock frequency is successfully configured.

S1212: The modem sends the received clock frequency configuration response to the radio interface layer.

The radio interface layer receives the clock configuration response. If clock frequency configuration succeeds, the radio interface layer sends the power-on instruction to the modem. Otherwise, the radio interface layer sends the power-off instruction to the modem to reconfigure a clock frequency.

S1213 and S1214 form a power-on process of the SIM card.

For step S1213 and step S1214, refer to step S1201 and step S1202. Details are not described herein again.

An embodiment of this application proposes a SIM card power-on method for an electronic device. The electronic device in the method has a SIM card. The method includes: The electronic device powers on the SIM card, and provides a clock signal of a first frequency to the SIM card; if a status word of network access authentication from the SIM card is different from a first status word, the electronic device powers off the SIM card, where the first status word indicates that the SIM card can communicate with a base station under the clock signal provided by the electronic device; and the electronic device powers on the SIM card, and provides a clock signal of a second frequency to the SIM card, where the second frequency is different from the first frequency. When the case, described in Scenario 3, in which the normal communication of the SIM card cannot be implemented occurs, to be specific, when a clock frequency at which the SIM card can operate is inconsistent with the clock frequency provided by the electronic device to the SIM card, the electronic device cannot normally use a mobile cellular network, make a call, or text an SMS message. According to the method, the modem adjusts the clock frequency provided to the SIM card, and then provides an adjusted clock frequency to the SIM card. In this way, the SIM card can be recovered to normally operate. In addition, the electronic device is recovered to use the mobile cellular network, make the call, and text the SMS message. In this way, a user can use a mobile cellular network, make a call, and text an SMS message without replacing the SIM card.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A subscriber identification module (SIM) card detection failure recovery method implemented by an electronic device, wherein SIM card detection failure recovery method comprises:
   obtaining power-on information comprising at least one of a first status of a SIM card, a second status of a SIM card tray of the electronic device that is configured to place a SIM card, a third status of a modem of the electronic device, or whether nonvolatile (NV) items for the SIM card are successfully loaded, wherein the NV items record operator information of the SIM card and configure a network type of the modem, wherein the first status indicates either the SIM card is detected by the modem or the SIM card is not detected by the modem, and wherein the third status indicates either the modem is turned on or the modem is turned off;
   determining that the power-on information meets the following conditions:
      the SIM card is not detected by the modem;
      the SIM card tray is plugged into a SIM card interface of the electronic device that is configured to couple to the SIM card;
      the modem is turned on; and
      the NV items are successfully stored; and
   powering on the SIM card in response to determining that the SIM card is not detected by the modem, the SIM card tray is plugged into the SIM card interface, the modem is turned on, and the NV items are successfully stored.

2. The SIM card detection failure recovery method of claim 1, further comprising:
   generating a power-on instruction using an application processor of the electronic device; and
   further powering on, in response to the power-on instruction, the SIM card using the modem.

3. The SIM card detection failure recovery method of claim 1, further comprising:
   further powering on, using the modem, the SIM card according to a power-on instruction from an application processor of the electronic device;
   powering off, using the modem, the SIM card according to a power-off instruction from the application processor; and
   enabling a radio frequency function in the modem.

4. The SIM card detection failure recovery method of claim 1, further comprising:
   detecting that a display of the electronic device is on; and
   further powering on, the SIM card in response to detecting that the display is on.

5. The SIM card detection failure recovery method of claim 1, further comprising:
sending, using the modem, a first command to the SIM card at an interval of a preset time, wherein the first command is used to query queries whether the SIM card is powered on; and
the power-on information when the modem does not receive, from the SIM card and within the preset time, a response for the first command.

6. The SIM card detection failure recovery method of claim 1, further comprising:
setting a reset pin of the SIM card to a low electrical level by using the modem;
setting a voltage pin of the SIM card to a high electrical level using the modem;
setting an input/output interface of the SIM card to a receiving state using the modem; and
providing a clock signal to a clock pin of the SIM card using the modem.

7. The method of claim 1, further comprising performing, using the modem and based on the NV items, a network selection.

8. The method of claim 1, wherein the NV items record a first radio frequency parameter, and wherein the method further comprises configuring, based on the first radio frequency parameter, a second radio frequency parameter of the modem.

9. The method of claim 1, further comprising:
identifying that the NV items are not successfully stored; and
restarting the modem and powering off the SIM card in response to identifying that the NV items are not successfully stored.

10. An electronic device comprising:
a subscriber identification module (SIM) card tray configured to place a SIM card;
a SIM card interface configured to couple to the SIM card;
a modem; and
coupled to the SIM card tray, the SIM card interface, and the modem and configured to:
obtain power-on information comprising at least one of a first status of the SIM card, a second status of the SIM card tray, a third status of the modem, or whether nonvolatile (NV) items for the SIM card are successfully stored, wherein the NV items record operator information of the SIM card and configure a network type of the modem, wherein the first status indicates either the SIM card is detected by the modem or the SIM card is not detected by the modem, and wherein the third status indicates either the modem is turned on or the modem is turned off;
determine that the power-on information meets the following conditions the SIM card is not detected by the modem, the SIM card tray is plugged into the SIM card interface, the modem is turned on, and the NV items are successfully stored; and
power on the SIM card using the modem.

11. The electronic device of claim 10, wherein the processor is further configured to:
generate a power-on instruction; and
further power on the SIM card by using the modem and in response to the power-on instruction.

12. The electronic device of claim 10, wherein the processor is further configured to:
further power on, using the modem, the SIM card according to the power-on instruction; and
power off, using the modem, the SIM card according to a power-off instruction.

13. The electronic device of claim 10, wherein when the processor is further configured to:
detect that a display of the electronic device is on; and
further power on the SIM card using the modem and in response to detecting that the display is on.

14. The electronic device of claim 10, wherein when the processor is further configured to:
send, to the SIM card at an interval of a preset time using the modem, a first instruction querying whether the SIM card is powered on; and
obtain the power-on information when the modem does not receive, within the preset time, a response for the first instruction from the SIM card.

15. The electronic device of claim 10, wherein the SIM card comprises a reset pin, a voltage pin, a clock pin, and an input/output interface, and wherein the processor is further configured to:
set, using the modem, the reset pin to a low electrical level;
set, using the modem, the voltage pin to a high electrical level;
set, using the modem, the input/output interface to a receiving state; and
provide, using the modem, a clock signal to the clock pin.

16. The electronic device of claim 10, wherein the processor is further configured to perform, using the modem and based on the NV items, a network selection.

17. The electronic device of claim 10, wherein the NV items record a first radio frequency parameter, and wherein the processor is further configured to configure, based on the first radio frequency parameter, a second radio frequency parameter of the modem.

18. The electronic device of claim 10, wherein the processor is further configured to:
identify that the NV items are not successfully stored; and
restart the modem and power off the SIM card in response to identifying that the NV items are not successfully stored.

* * * * *

UNITED STATES PATENT AND TRADEMARK OFFICE
CERTIFICATE OF CORRECTION

| | | |
|---|---|---|
| PATENT NO. | : 12,105,606 B2 | Page 1 of 1 |
| APPLICATION NO. | : 17/641029 | |
| DATED | : October 1, 2024 | |
| INVENTOR(S) | : Boer Jiang et al. | |

It is certified that error appears in the above-identified patent and that said Letters Patent is hereby corrected as shown below:

In the Claims

Claim 5, Column 37, Line 5: "command is used to query queries" should read "command queries"

Claim 5, Column 37, Line 7: "the power-on" should read "obtaining the power-on"

Claim 10, Column 37, Line 39: "coupled to" should read "a processor coupled to"

Claim 10, Column 37, Line 53: "conditions the" should read "conditions: the"

Signed and Sealed this
Twelfth Day of November, 2024

Katherine Kelly Vidal
*Director of the United States Patent and Trademark Office*